(12) United States Patent
Chigira et al.

(10) Patent No.: US 7,156,520 B2
(45) Date of Patent: Jan. 2, 2007

(54) COLOR SEPARATING OPTICAL SYSTEM, IMAGE DISPLAY OPTICAL SYSTEM, AND PROJECTION IMAGE DISPLAY APPARATUS

(75) Inventors: Tatsuo Chigira, Tochigi (JP); Atsushi Okuyama, Saitama (JP); Masayuki Abe, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/235,975

(22) Filed: Sep. 4, 2002

(65) Prior Publication Data

US 2003/0067586 A1 Apr. 10, 2003

(30) Foreign Application Priority Data

Sep. 4, 2001 (JP) .................... 2001-268069
Oct. 26, 2001 (JP) .................... 2001-329657

(51) Int. Cl.
G03B 21/14 (2006.01)
G03B 21/18 (2006.01)
G03B 21/26 (2006.01)
G03B 21/28 (2006.01)
G02F 1/1335 (2006.01)

(52) U.S. Cl. .................... 353/20; 353/31; 353/34; 353/37; 353/52; 353/81; 349/9

(58) Field of Classification Search .................... 353/20, 353/31, 33, 34, 37, 52, 81; 349/8, 9
See application file for complete search history.

(56) References Cited

U.S. PATENT DOCUMENTS

| 6,052,214 A | 4/2000 | Chuang et al. ............ 359/246 |
| 6,183,091 B1 | 2/2001 | Johnson et al. ............ 353/20 |
| 6,262,842 B1 * | 7/2001 | Ouderkirk et al. .......... 359/487 |
| 6,447,121 B1 * | 9/2002 | Woo ............................ 353/52 |
| 2002/0109820 A1 * | 8/2002 | Pan .............................. 353/20 |
| 2002/0126263 A1 | 9/2002 | Konishi ....................... 353/31 |
| 2002/0140905 A1 | 10/2002 | Ouchi et al. ................ 553/31 |
| 2003/0025880 A1 * | 2/2003 | Newell et al. ............... 353/20 |
| 2003/0058411 A1 * | 3/2003 | Katsumata et al. .......... 353/31 |
| 2003/0107809 A1 * | 6/2003 | Chen et al. ................. 359/498 |

FOREIGN PATENT DOCUMENTS

| EP | 0 722 253 | 7/1996 |
| EP | 0 991 281 | 4/2000 |
| EP | 0 991 281 A2 | 4/2000 |
| JP | 09098442 | 4/1997 |
| JP | 11-153774 | 6/1999 |
| JP | 2001-154152 | 6/2001 |
| JP | 2001-154268 | 6/2001 |
| JP | 2001-201794 | 7/2001 |

(Continued)

OTHER PUBLICATIONS

English Abstract for Japanese Patent Application 2001-201794 (Item A above).

(Continued)

Primary Examiner—Melissa Jan Koval
(74) Attorney, Agent, or Firm—Morgan & Finnegan, L.L.P.

(57) ABSTRACT

A color separating-combining optical system is configured to separate illumination light into a plurality of color spectrums, guiding these color spectrums to respective image display elements, and combining the color spectrums modulated by the image display elements. The system includes a first polarization separating optical system that reflects the first color spectrum from the separating optical system to a first image display element and transmits the first color spectrum from the first image display element to the combining optical system. Similarly, a second polarization separating optical system is provided that reflects and transmits the second color spectrum. The degree of linear polarization of a reflected color can be maintained higher than that of another, and/or an antireflection element can be included in the path of reflected light.

33 Claims, 8 Drawing Sheets

FOREIGN PATENT DOCUMENTS

| | | |
|---|---|---|
| JP | 2001-154268 | 8/2001 |
| JP | 2001-154294 | 8/2001 |
| JP | 2001-221988 | 8/2001 |
| JP | 2002-258405 | 10/2002 |
| WO | WO 01/50178 | 7/2001 |

OTHER PUBLICATIONS

English Abstract for Japanese Patent Application 2001-221988 (Item B above).

English Abstract for Japanese Patent Application 2002-258405 (Item C above).

Partial European Search Report, Nov. 28, 2002.

Copy of Office Action dated Jul. 30, 2004 issued in counterpart Application No. 02141576.5 pending in the Patent Office of the People's Republic of China.

English Abstract for Japanese Patent Applicaiton 2001-154268 (Item B above).

English Abstract for Japanese Patent Application 11-153774 (Item C above).

English Patent Abstract for Japanese Publication No. 2001-154152.

English Patent Abstract for Japanese Publication No. 09098442.

European Patent Office Communication dated Oct. 06, 2005 in correspondent application No. PCT/0407889.6-2202.

Office Action dated Sep. 29, 2005, which was issued from the Japan Patent Office for counterpart Japanese patent application JP 2001-268069.

English language translation of Office Action dated Sep. 29, 2005, which was issued from the Japan Patent Office for counterpart Japanese patent application JP 2001-268069.

Dialog: English language translation of abstract for JP 2001-154294.

Dialog: English language translation of abstract for JP 2001-154268.

* cited by examiner

COLOR SEPARATING OPTICAL SYSTEM, IMAGE DISPLAY OPTICAL SYSTEM, AND PROJECTION IMAGE DISPLAY APPARATUS

BACKGROUND OF THE INVENTION

1. Field of the Invention

The present invention relates to a color separating-combining optical system configured to separate illumination light into a plurality of color spectrums, guiding these color spectrums to respective image display elements, and combining the color spectrums modulated by the image display elements, and an image display optical system and projection image display apparatus using it.

2. Description of Related Art

The projection image display apparatus including a combination of reflective liquid crystal display elements with polarizing beam splitters is disclosed, for example, in U.S. Pat. No. 6,183,091. The projection image display apparatus described in this US patent incorporates first, second, third, and fourth polarizing beam splitters 118, 120, 128, 124 and three color-selective phase differentiate plates (retarder stacks) 116, 126, 134, as shown in FIG. 8.

A color-selective phase differentiate plate is a retarder stack that acts so as to rotate a polarized direction of light in a predetermined wavelength region among the visible wavelength region by 90° but keep a polarized direction of light of the other wavelengths unchanged.

In the apparatus shown in FIG. 8, illumination light exiting a light source 100 is aligned into linearly polarized light (S polarized light) by a polarization changer 114, the first color-selective phase differentiate plate 116 rotates a polarized direction of only light of blue (B) out of the linearly polarized light (S polarized light) by 90° (into P polarized light), and the first polarizing beam splitter 118 receives the light to transmit the B light of P polarized light and reflect the light of green (G) and red (R) of S polarized light excluding the B light, thereby effecting color separation. The light of B (P polarized light) travels through the second polarizing beam splitter 120 and impinges on a reflective liquid crystal display B 122. The light of G and R enters the second color-selective phase differentiate plate 126, the phase differentiate plate 126 rotates only the polarized direction of G by 90° (into P polarized light), and the second polarizing beam splitter 120 transmits the G light of P polarized light and reflects the R light of S polarized light, thereby effecting color separation.

The separate light spectrums of G and R impinge on a reflective liquid crystal display G 132 and on a reflective liquid crystal display R 130, respectively.

The P polarization component out of the B light modulated by the reflective liquid crystal display B 122 travels straight through the second polarizing beam splitter 120 and returns toward the light source 100, while the S polarization component thereof is reflected in the second polarizing beam splitter 120 to become projected light. The S polarization component of the R light modulated by the reflective liquid crystal display R 130 is reflected in the third polarizing beam splitter 128 and returns toward the light source 100, while the P polarization component thereof travels straight through the third polarizing beam splitter 128 to become projected light. Furthermore, the P polarization component of the G light modulated by the reflective liquid crystal display G 132 travels straight through the third polarizing beam splitter 128 and returns toward the light source 100, while the S polarization component thereof is reflected in the third polarizing beam splitter 128 to become projected light.

The projected light of G and R is incident into the third color-selective phase differentiate plate 134, by which only the polarized direction of G is rotated by 90°. Therefore, the light spectrums of G and R are aligned both into P polarized light. Then the light of G and R travels through the fourth polarizing beam splitter 124 and the B light of S polarized light is reflected in the fourth polarizing beam splitter 124. This results in combining the light spectrums of R, G, and B into one and projecting the composite light as a color image onto a projection surface.

In the projection image display apparatus proposed in Japanese Patent Application Laid-Open No. 2001-154152, a sheet polarizer (polarizing plate) is placed between an illumination optical system and a polarizing beam splitter as color separating-combining means or between a polarizing beam splitter and a projection lens so as to obtain an image with high contrast.

In general, the polarizing beam splitters demonstrate the ideal polarization separation performance as shown in FIG. 9, for light incident at 45°, but have the imperfect characteristics as shown in FIG. 10, for light incident at angles except for 45°, however.

This occurs for the following reason: in an optical thin film formed in the polarizing beam splitters, where n represents the refractive index of the thin film, d the thickness of the thin film, and $\theta$ the angle of incidence of light, the optical thin film acts according to nd cos $\theta$ of its optical performance, so that the optical performance varies depending upon the angle $\theta$ of incidence.

In the projection image display apparatus as described above, because the light illuminating the reflective liquid crystal displays is light beams having some angular spread 2$\omega$ (2$\omega$ is determined by the illumination system), the light with the spread of 45°±$\omega$ is incident into the polarizing beam splitters. For this reason, the P polarization component and the S polarization component are not perfectly separated in the polarizing beam splitters, so that the light incident to the liquid crystal displays is not perfect linearly polarized light. This results in decrease of contrast and thus poses a problem of degradation of quality of the projected image.

Furthermore, the polarization changer used in the illumination system is an element that aligns the lamp light including the mixture of P polarized light and S polarized light, into a predetermined polarization orientation, but the efficiency of the conversion is not 100%. Therefore, there remains an undesired polarization component at a considerable rate.

In the ordinary polarizing beam splitters, a balance is achieved, for example, between a ratio of reflection of P polarized light and a ratio of transmission of S polarized light, and for this reason, for example, light reflected by a polarizing beam splitter configured to reflect the P polarized light includes a measure of the S polarization component.

While the reflective liquid crystal display is displaying black, the P polarized light incident into the polarizing beam splitter is reflected in the P polarization orientation in the polarizing beam splitter and returns toward the light source, but because of the characteristics of the polarizing beam splitter, part of the S polarized light mixed in the illumination light impinging on the reflective liquid crystal display, travels straight through the polarizing beam splitter and toward the projection lens.

If polarizers are placed on the entrance side and on the exit side of the polarizing beam splitter by applying the configuration proposed in Japanese Patent Application Laid-Open No. 2001-154152, the aforementioned problem of contrast decrease caused by the characteristics of the polarizing beam splitter can be solved, but another problem of decrease in brightness will arise, because the transmittance of the polarizers is not 100%.

In FIG. 8, most of the S polarized light for display of the image of B is reflected by the polarization separating surface of the second polarizing beam splitter 120 and travels through the fourth polarizing beam splitter 124 toward the projection surface, but part thereof travels toward the first polarizing beam splitter 118. Furthermore, part of the light traveling toward the first polarizing beam splitter 118 is reflected by the polarization separating surface of the first polarizing beam splitter 118 and then travels toward a surface 118a, which is neither an entrance surface nor an exit surface in the first polarizing beam splitter 118.

Then the light incident to the surface 118a is reflected there and travels through the first polarizing beam splitter 118 and into the third polarizing beam splitter 128, because of influence of so-called phase jump upon reflection or deviation from the ideal action of the polarizing beam splitter for the light with inclination as described previously. The light entering the third polarizing beam splitter 128 is then incident to the R and G liquid crystal panels 130, 132 and part thereof is finally projected onto the projection surface.

When the so-called leaking light at the polarization separating surface passes through the primarily unexpected paths as described, it can pose the problem of decrease in the contrast of the projected image. When the light modulated by the different color liquid crystal panels is projected onto the projection surface, it can pose a problem of variation in the color tone.

Furthermore, because the light in the color separating-combining optical system is converging light, the light turning into stray light may arrive even at surfaces parallel to the plane where principal rays pass. The light is also reflected on such surfaces to pose a problem that the interior of the color separating-combining optical system is filled with the stray light.

SUMMARY OF THE INVENTION

In consideration of above describe situation, a color separating-combining optical system according to the present invention is a color separating-combining optical system comprising:

a separating optical system which separates illumination light into a first color spectrum, and second and third color spectrums;

a first polarization separating optical system with a first polarization separating surface, which guides the first color spectrum from the separating optical system to a first image display element and which analyzes light from the first image display element;

a second polarization separating optical system with a second polarization separating surface, which separates the second and third color spectrums from the separating optical system from each other, which guides the second color spectrum to a second image display element, which guides the third color spectrum to a third image display element, and which analyzes light from the second image display element and light from the third image display element; and a combining optical system which combines light from the first polarization separating optical system with light from the second polarization separating optical system;

wherein a polarization separation characteristic of the first polarization separating surface of the first polarization separating optical system is different from a polarization separation characteristic of the second polarization separating surface of the second polarization separating optical system.

In the above optical system, preferably, when a degree of linear polarization is defined as a rate of a component in a principal polarized direction included in each of the first, second, and third color spectrums, the polarization separation characteristic of the first polarization separating surface of the first polarization separating optical system is made different from the polarization separation characteristic of the second polarization separating surface of the second polarization separating optical system so that a degree of linear polarization of the first color spectrum incident from the first polarization separating surface to the first image display element is higher than degrees of linear polarization of the second and third color spectrums incident from the second polarization separating surface to the second and third image display elements.

Alternatively, the above optical system may be configured so that, when a degree of linear polarization is defined as a rate of a component in a principal polarized direction included in each of the first, second, and third color spectrums, the second polarization separating surface has such a polarization separation characteristic that degrees of linear polarization of the second and third color spectrums reflected by the second polarization separating surface are substantially equal to degrees of linear polarization of the second and third color spectrums transmitted by the second polarization separating surface.

Alternatively, the above optical system may be configured so that, when a degree of linear polarization is defined as a rate of a component in a principal polarized direction included in each of the first, second, and third color spectrums, the first polarization separating surface has such a polarization separation characteristic that a degree of linear polarization of the first color spectrum incident from the first polarization separating surface to the first image display element is higher than a degree of linear polarization of the first color spectrum traveling from the first image display element via the first polarization separating surface toward the combining optical system.

Alternatively, the above optical system may be configured to further comprise a polarizing plate placed between the first polarization separating surface and the combining optical system.

Alternatively, the above optical system may be configured so that the image display elements are reflective image display elements.

Alternatively, the above optical system may be configured so that the combining optical system is a third polarization separating optical system with a third polarization separating surface, which combines the first color spectrum from the first polarization separating surface with the second and third color spectrums from the second polarization separating surface by polarization separating action.

The optical system may be configured to further comprise an antireflection surface formed on a surface except for an entrance surface and an exit surface in at least one optical system out of the first polarization separating optical system, the second polarization separating optical system, and the third polarization separating optical system.

In the above optical system, the first color spectrum may be green light.

In consideration of above describe situation, an image display optical system according to the present invention is an image display optical system comprising:

the color separating-combining optical system as set forth;

an illumination system which makes illumination light enter the color separating-combining optical system while being aligned in a polarized direction; and a projection optical system which projects combined light exiting the color separating-combining optical system.

A projection image display apparatus preferably comprises:

first, second, and third image display elements; and the image display optical system as set forth.

In the above projection image display apparatus, the first, second, and third image display elements may be reflective image display elements.

In consideration of above describe situation, another color separating-combining optical system according to the present invention is a color separating-combining optical system comprising:

a separating optical system which separates illumination light into a first color spectrum, and second and third color spectrums;

a first polarization separating optical system with a first polarization separating surface, which guides the first color spectrum from the separating optical system to a first image display element and which analyzes light from the first image display element;

a second polarization separating optical system with a second polarization separating surface, which separates the second and third color spectrums from the separating optical system from each other, which guides the second color spectrum to a second image display element, which guides the third color spectrum to a third image display element, and which analyzes light from the second image display element and light from the third image display element; and a combining optical system which combines the first color spectrum from the first polarization separating surface with the second and third color spectrums from the second polarization separating surface;

wherein at least one surface except for an entrance surface and an exit surface in the first polarization separating optical system, is comprised of a light-absorbing surface.

In the above optical system, preferably, the combining optical system is a third polarization separating optical system with a third polarization separating surface, which combines the first color spectrum from the first polarization separating surface with the second and third color spectrums from the second polarization separating surface by polarization separating action.

Alternatively, the above optical system may be configured so that at least one surface except for an entrance surface and an exit surface in the third polarization separating optical system, is comprised of a light-absorbing surface.

Alternatively, the above optical system may be configured so that a surface located in a direction of extension of an optical axis of incidence to the first polarization separating surface, out of surfaces except for an entrance surface and an exit surface in the first polarization separating optical system, is comprised of a light-absorbing surface.

Alternatively, the above optical system may be configured so that a surface located in parallel with an optical axis, out of surfaces except for entrance surfaces and exit surfaces in the first and second polarization separating optical systems, is comprised of a light-absorbing surface.

Alternatively, the above optical system may be configured so that a surface located in a direction of extension of an optical axis of incidence to the third polarization separating surface, out of surfaces except for an entrance surface and an exit surface in the third polarization separating optical system, is comprised of a light-absorbing surface.

Alternatively, the above optical system may be configured so that a surface located in parallel with an optical axis, out of surfaces except for an entrance surface and an exit surface in the third polarization separating optical system, is comprised of a light-absorbing surface.

Alternatively, the above optical system may be configured so that the light-absorbing surface is a surface obtained in such a way that a surface except for an entrance surface and an exit surface is changed into a rough surface with predetermined surface roughness and the rough surface is coated with a black light-absorbing paint.

Alternatively, the above optical system may be configured to comprise a heat radiating member thermally coupled to the light-absorbing surface.

An image display optical system may comprise:

the color separating-combining optical system as set forth;

an illumination system which makes illumination light enter the color separating-combining optical system while being aligned in a polarized direction; and a projection optical system which projects combined light exiting the color separating-combining optical system.

A projection image display apparatus may be configured to comprise:

first, second, and third image display elements; and the image display optical system as set forth.

In the above projection image display apparatus, the first, second, and third image display elements may be reflective image display elements.

Specific applications of the present invention will be explicitly described in the detailed description of the invention which will follow.

DETAILED DESCRIPTION OF THE PREFERRED EMBODIMENTS

First Embodiment

Figure 1:
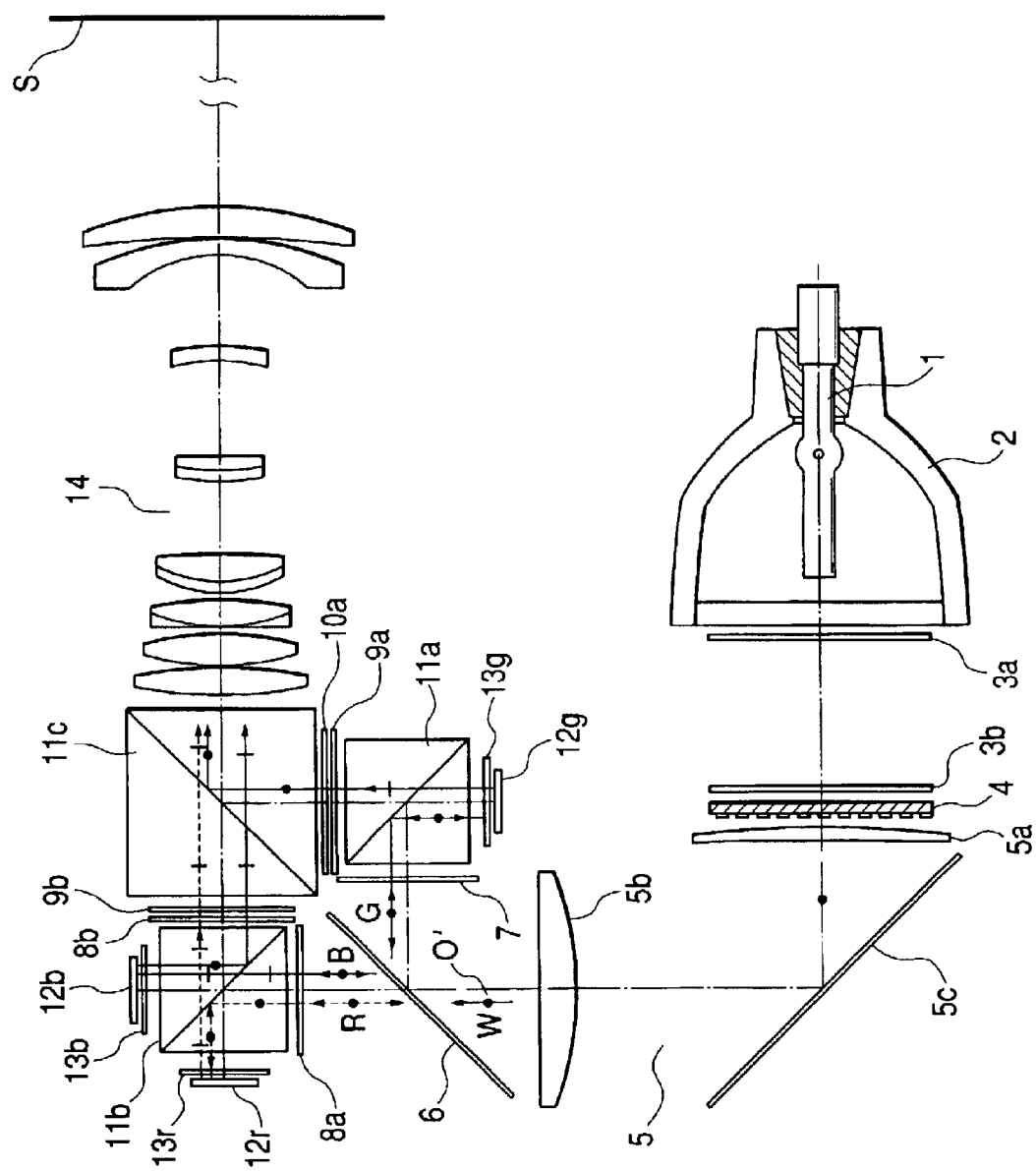
FIG. 1 is a diagram showing a configuration of a projection image display apparatus as a first embodiment.

FIG. 1 shows the configuration of the projection image display apparatus as a first embodiment of the present invention. In FIG. 1, numeral 1 designates a light source which emits a continuous spectrum of white light, and 2 a reflector which collects the light from the light source 1 into a predetermined direction.

Reference symbol 3a represents a first fly's eye lens in which rectangular lenses are arranged in a matrix pattern, 3b a second fly's eye lens consisting of an array of lenses corresponding to the individual lenses of the first fly's eye lens, and 4 a polarization changer which aligns unpolarized light into predetermined polarized light. Numeral 5 denotes a condensing optical system, wherein symbol 5a represents a condenser lens, 5b a field lens, and 5c a mirror. These elements above constitute an illumination system.

Numeral 6 indicates a dichroic mirror which transmits light in the wavelength region of blue (B) and red (R) and which reflects light in the wavelength region of green (G).

Although the present embodiment utilizes the dichroic mirror, the present invention also permits use of a polarizing beam splitter, without having to be limited to the dichroic mirror. In that case, there is a need for a means that makes the polarized direction of the light in the wavelength region of green different 90° from that of the light in the wavelength region of blue and red, on the light source side of the polarizing beam splitter. As one of the means, a color-selective wave plate may be placed so as to rotate only the polarized direction of the light in the green wavelength region by 90°, or it is also possible to employ a known method of preliminarily separating the light into three colors by the dichroic mirror, changing the polarized direction, and re-combining the optical paths of the three colors. As described, a color separating optical system can be constructed using the dichroic mirror or the polarizing beam splitter. Concerning the color separating optical system described above, the same as the above also applies to the other embodiments described hereinafter.

Numeral 7 represents a color filter which cuts off part of light in the intermediate wavelength region between G and R.

Symbols 8a and 8b indicate first and second color-selective phase differentiate plates which change the polarized direction of the B light by 90° and which keep the polarized direction of the R light unchanged. Symbols 9a and 9b denote first and second polarizing plates, and 10a a half wave plate.

Symbols 11a and 11b denote first and second polarizing beam splitters which transmit the P polarized light but reflect the S polarized light and which have respective polarization separating surfaces (first and second polarization separating surfaces). Symbol 11c designates a third polarizing beam splitter (color combining optical system) which transmits the P polarized light but reflects the S polarized light and which has a polarization separating surface (third polarization separating surface).

Symbols 12r, 12g and 12b are a reflective liquid crystal display for red, a reflective liquid crystal display for green, and a reflective liquid crystal display for blue, respectively, which reflect incident light and modulate the light according to respective images. Symbols 13r, 13g and 13b represent a quarter wave plate for red, a quarter wave plate for green, and a quarter wave plate for blue, respectively. The above elements from the dichroic mirror 6 to the quarter wave plates 13r, 13g and 13b constitute a color separating-combining optical system.

Numeral 14 denotes a projection lens, which constitutes a projection optical system. An image display optical system is composed of the above-stated illumination system, color separating-combining optical system, and projection optical system.

The optical action will be described below. The light exiting the light source 1 is collected into a predetermined direction by the reflector 2. The reflector 2 is of the parabolic shape and light from the focal point of the paraboloid is changed into beams parallel to the symmetry axis of the paraboloid.

However, the light source 1 is not an ideal point source but has a finite size. Therefore, the collected beams include a lot of light components that are not parallel to the symmetry axis O of the paraboloid.

These collected beams are incident into the first fly's eye lens 3a. The first fly's eye lens 3a is comprised of a matrix like combination of lenses having the rectangular contour and a positive refracting power. The incident beams are divided into a plurality of beams according to the respective lenses, and the beams are focused and guided through the second fly's eye lens 3b to form a plurality of light source images in a matrix pattern in the vicinity of the polarization changer 4.

The polarization changer 4 consists of polarization separating surfaces, reflective surfaces, and a half wave plate, and the plurality of beams focused in the matrix pattern are incident to the polarization separating surfaces corresponding to their columns, to be divided into transmitted light of the P polarization component and reflected light of the S polarization component.

The reflected light of the S polarization component is reflected on the reflective surfaces and then exits the polarization changer in the same direction as the P polarization component. On the other hand, the transmitted light of the P polarization component passes through the half wave plate 4c to be converted into the same polarization component as the S polarization component, and the converted light exits as light aligned in the polarized direction (•). The polarization changer 4 is a known polarization changing element.

After emerging from the polarization changer 4, the plurality of beams thus polarization-changed arrive as diverging beams at the condensing optical system 5. The mirror 5c in the condensing optical system 5 has no refracting power.

Figure 2:
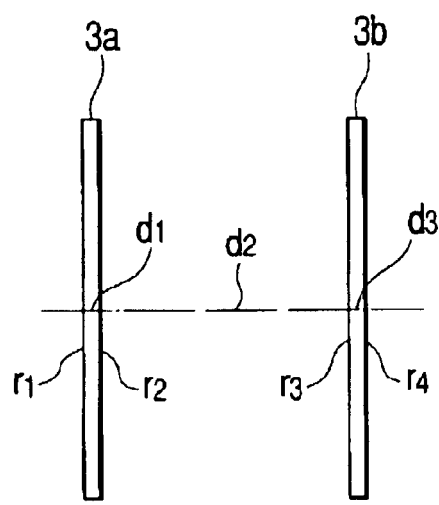
FIG. 2 is a diagram explaining fly's eye lenses used in the projection image display apparatus.
Figure 3:
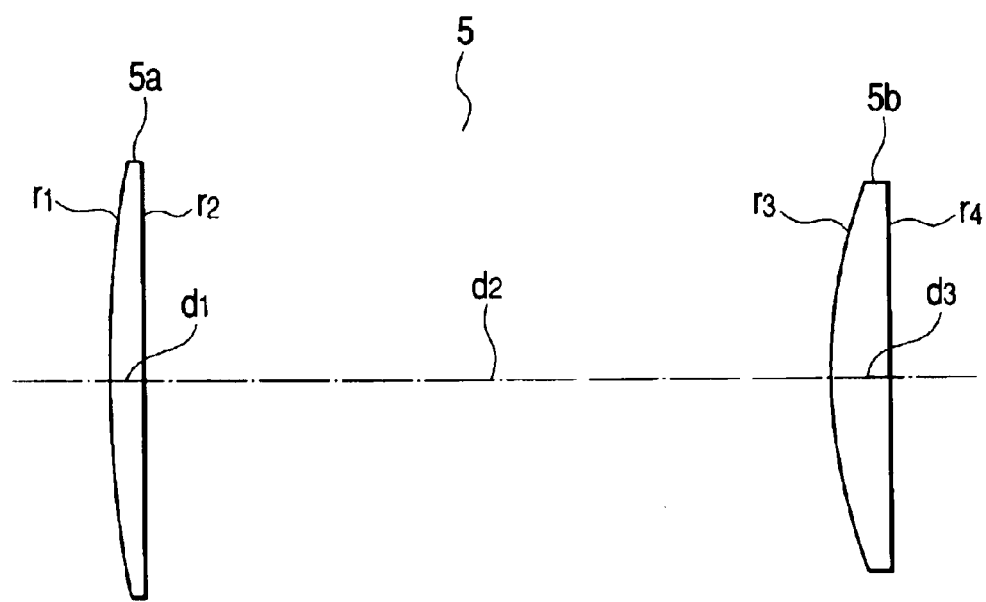
FIG. 3 is a diagram explaining a condensing optical system in the projection image display apparatus.

Table 1 presents the lens data of the fly's eye lenses 3a, 3b shown in FIG. 2, and Table 2 the lens data of the condensing optical system 5 shown in FIG. 3. In these Tables 1 and 2, r represents the radius of curvature of each lens surface, d a surface separation, and n a refractive index of each material.

TABLE 1

| Surface | r | d | n |
|---|---|---|---|
| 1 | 16.8 | 1.5 | 1.516 |
| 2 | ∞ | 27.6 | |
| 3 | ∞ | 1.5 | 1.517 |
| 4 | −15.3 | | | units of r and d: mm

The surfaces 1 and 2 represent the first fly's eye lens 3a, and the surfaces 3 and 4 the second fly's eye lens 3b.

TABLE 2

| Surface | r | d | n |
|---|---|---|---|
| 1 | 196.0 | 3.0 | 1.723 |
| 2 | ∞ | 76.9 | |
| 3 | 60.1 | 7.0 | 1.723 |
| 4 | ∞ | | | units of r and d: mm

The surfaces 1 and 2 represent the condenser lens 5*a*, and the surfaces 3 and 4 the field lens 5*b*.

The resultant focal length fc of the condensing optical system 5 is as follows:

fc=82.4 mm, and the focal length ff2 of the second fly's eye lens 3*b* is as follows:

ff2=29.5 mm.

For this reason, the condensing optical system 5 forms images of rectangular shape of the first fly's eye lens 3*a* at the magnification β determined as follows.

β=*fc/ff2*=2.793

This makes the plurality of beams superimposed at the position of the images of rectangular shape, thus forming rectangular, uniform illumination areas. The reflective liquid crystal displays 12*r*, 12*g* and 12*b* are placed in the illumination areas.

Since the focal length fc2 of the field lens 5*b* is determined as follows:

fc2=84 mm, the ratio fc/fc2 is calculated as fc/fc2=0.98, and thus the light focused onto the reflective liquid crystal displays in the optical paths from the field lens 5*b* to the reflective liquid crystal displays is almost telecentric relative to the optical axis O' of the condensing optical system 5.

The dichroic mirror 6 and the polarizing beam splitters 11*a*, 11*b* and 11*c* are comprised of optical thin films, and characteristics thereof vary according to angles of incidence to these optical thin films. Since the illumination beams to the reflective liquid crystal displays are set telecentric, the variation in the characteristics occurring at the optical thin films does not appear on the reflective liquid crystal displays.

Figure 4:
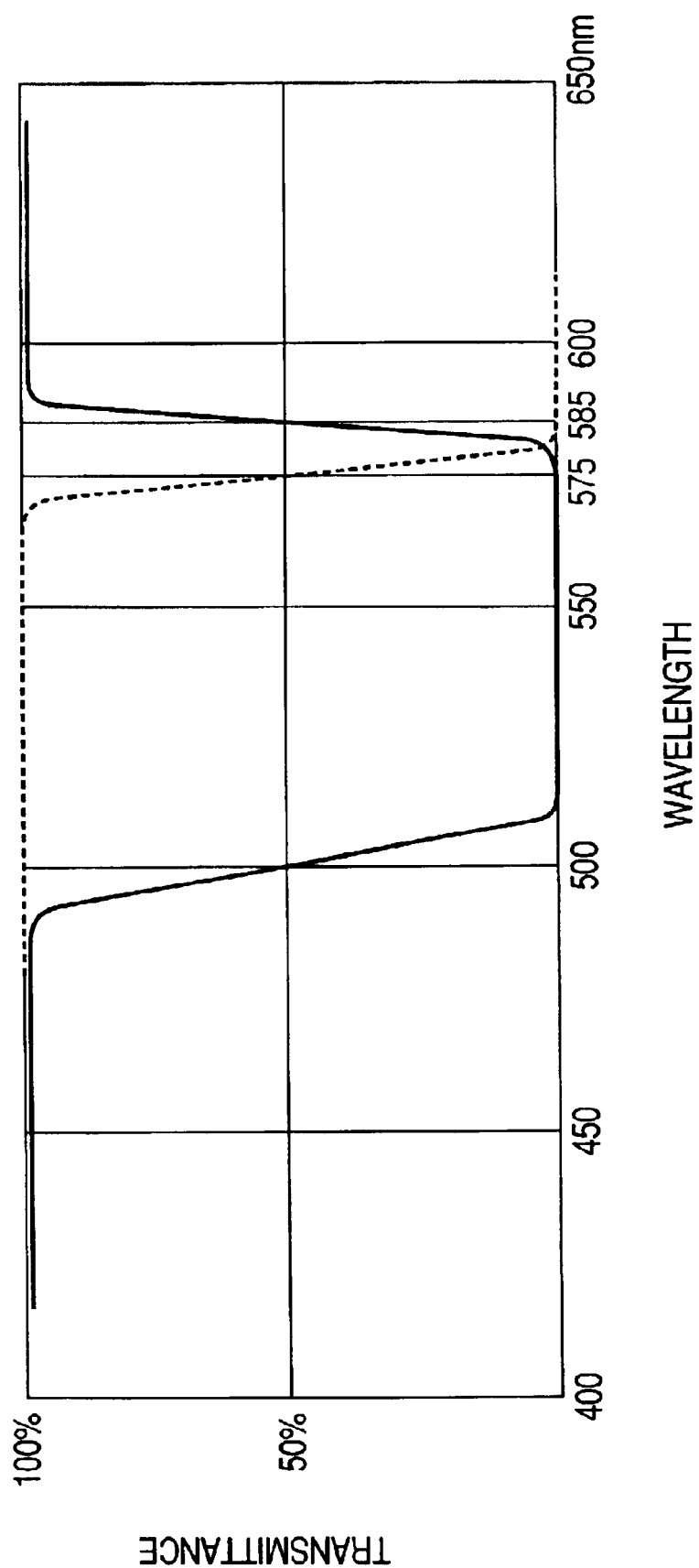
FIG. 4 is a diagram explaining characteristics of a dichroic mirror and a color filter used in the projection image display apparatus.

The dichroic mirror 6 has the characteristics as indicated by the solid line in FIG. 4, and transmits the light of B (430 to 495 nm) and R (590 to 650 nm) but reflects the light of G (505 to 580 nm). The transmittance for the S polarization component of G is set not more than 1% at 550 nm, which is the center wavelength of the wavelength range of G, so as to prevent degradation of color purity of the other two color spectrums.

In FIG. 1, the light changed into the S polarized light by the polarization changer 4 still remains as S polarized light (•) even after separated by the dichroic mirror 6.

In the optical path of G, the light reflected by the dichroic mirror 6 is incident to the color filter 7. The color filter 7 has the characteristics as indicated by the dashed line in FIG. 4, and removes yellow light, as a dichroic filter reflecting the color spectrum of yellow (575 to 585 nm) which is an intermediate wavelength region between G and R. If green light includes a lot of the yellow color component, green will turn yellow green. Therefore, it is desirable to remove the yellow light in terms of color reproduction. The color filter 7 may be one having the property of absorbing the yellow light.

The light of G color-adjusted in this way is incident as S polarized light (•) into the first polarizing beam splitter 11*a* and is reflected at the polarization separating surface to impinge on the G reflective liquid crystal display 12*g*.

The G reflective liquid crystal display 12*g* modulates the G light according to an image and reflects it. The S polarization component (•) out of the reflected G light thus image-modulated is again reflected at the polarization separating surface of the first polarizing beam splitter 11*a* to be guided back toward the light source and removed from the projected light.

On the other hand, the P polarization component (|) out of the reflected G light image-modulated is transmitted by the first polarization separating surface and travels as projected light toward the third polarizing beam splitter 11*c*.

In a state in which all the polarization components are converted into the S polarized light (in a black display state), the slow axis of the quarter wave plate 13*g* disposed between the first polarizing beam splitter 11*a* and the G reflective liquid crystal display 12*g* is adjusted into a predetermined direction, whereby it is feasible to keep down influence of disturbance of polarization occurring at the first polarizing beam splitter 11*a* and at the G reflective liquid crystal display 12*g*.

The polarization separating surface of the first polarizing beam splitter 11*a* has such a polarization separation characteristic that the rate of the S polarized light, which is the principal polarization component included in the light reflected at the polarization separating surface, i.e., the degree of linear polarization is particularly high (e.g., approximately 100%) and that the purity of the transmitted P polarized light is a little lower than the purity of the S polarized light.

Since the illumination light to illuminate the first reflective liquid crystal display 12*g* includes no unwanted polarization component because of the use of the polarizing beam splitter with such characteristics, at least the P polarization component of the light transmitted by (or emerging from) the first polarizing beam splitter 11*a* consists of the light acted upon by the first reflective liquid crystal display 12*g* and the quarter wave plate 13*g* for display of image and components of disturbed phases produced under unwanted action by the reflective liquid crystal display device, the quarter wave plate, and the polarizing beam splitter. The S polarization component reflected by the first polarizing beam splitter 11*a* (the S polarization component exiting the splitter 11*a*) is the S polarization component having been transmitted because of the characteristics of the polarization separating surface of the first polarizing beam splitter 11*a*, and the light of this S polarization component can be a cause of degradation of contrast of the projected image and is thus removed by the polarizer or the like.

The G light (|) emerging from the first polarizing beam splitter 11*a* is analyzed by the first polarizer 9*a* which transmits only the P polarized light. Through this process, the G light becomes light from which invalid components produced during the passage through the first polarizing beam splitter 11*a* and the G reflective liquid crystal display 12*g* are cut off. The polarized direction of the G light is then rotated 90° by the first half wave plate 10*a* the slow axis of which is set at 45° relative to the polarized direction, and the light is incident as S polarized light (•) into the third polarizing beam splitter 11*c*, and is then reflected by the polarization separating surface of the third polarizing beam splitter 11c to be guided to the projection lens 14.

If the slow axis of the first half wave plate 10a is arranged as rotatably adjustable, it is feasible to finely adjust the polarized direction of the G light incident to the polarization separating surface of the third polarizing beam splitter 11c.

By employing this configuration, where there is a relative inclination between the polarization separating surface of the first polarizing beam splitter 11a and the polarization separating surface of the third polarizing beam splitter 11c because of a mounting error or the like, the above adjusting mechanism can be used so as to minimize leakage of non-projected light in the third polarizing beam splitter 11c, thereby enabling image adjustment of black display in G.

Furthermore, the first polarizer 9a and the first half wave plate 10a may be bonded to each other, whereby they can be adjusted together.

The light of R and B passing through the dichroic mirror 6 is incident to the first color-selective phase differentiate plate 8a. The first color-selective phase differentiate plate has the action of rotating the polarized direction of only the B light by 90°, by which the B light is incident as P polarized light (|) while the R light is incident as S polarized light (•) into the second polarizing beam splitter 11b. The R light incident as the S polarized light (•) into the second polarizing beam splitter 11b is reflected by the polarization separating surface of the second polarizing beam splitter 11b and then impinges on the R reflective liquid crystal display 12r. The B light incident as the P polarized light (|) into the second polarizing beam splitter 11b passes through the polarization separating surface of the second polarizing beam splitter 11b and then impinges on the B reflective liquid crystal display 12b.

Here the polarization separating surface of the second polarizing beam splitter 11b has such a polarization separation characteristic that the rate of the P polarized light, which is the principal polarization component included in the light reflected at the polarization separating surface, i.e., the degree of linear polarization is approximately equal to the purity of the S polarized light which is the principal polarization component included in the light transmitted by the polarization separating surface (they are both approximately 95%). This maintains the balance between R and B, so as to ensure color reproducibility. The polarizing beam splitter having such a polarization separation characteristic can be substantiated, for example, by use of a polarizing beam splitter of a wire grid type.

The polarization separating surface of the first polarizing beam splitter 11a is provided with such a polarization separation characteristic that the degree of linear polarization of the light reflected by the polarization separating surface thereof is higher than the degree of linear polarization of the light reflected and transmitted by the polarization separating surface of the second polarizing beam splitter 11b. Namely, the polarization separating surface of the first polarizing beam splitter 11a has the polarization separation characteristic different from that of the polarization separating surface of the second polarizing beam splitter 11b.

The light of R incident to the R reflective liquid crystal display 12r is modulated according to an image thereon and reflected thereby. The S polarization component (•) out of the reflected R light thus image-modulated is again reflected by the polarization separating surface of the second polarizing beam splitter 11b and guided back toward the light source to be removed from the projected light.

On the other hand, the P polarization component (|) out of the reflected R light image-modulated is transmitted by the polarization separating surface of the second polarizing beam splitter 11b and travels as projected light toward the third polarizing beam splitter 11c.

The R light emerging from the second polarizing beam splitter 11b travels straight through the second color-selective phase differentiate plate 8b, is further analyzed by the second polarizer 9b, and then enters the third polarizing beam splitter 11c. The light then passes through the polarization separating surface of the third polarizing beam splitter 11c and travels to the projection lens 14.

The B light of incident to the B reflective liquid crystal display 12b is modulated according to an image thereon and reflected thereby. The P polarization component (|) out of the reflected B light image-modulated is again transmitted by the polarization separating surface of the second polarizing beam splitter 11b and guided back toward the light source to be removed from the projected light.

On the other hand, the S polarization component (•) out of the reflected B light image-modulated is reflected by the polarization separating surface of the second polarizing beam splitter 11b and travels as projected light toward the third polarizing beam splitter 11c.

At this time, the adjustment of display of black in each of R and B is carried out in the same manner as in the case of G, by adjusting the slow axis of the quarter wave plate 13b or 13r provided between the second polarizing beam splitter 11b and the R or B reflective liquid crystal display 12b; 12r.

Among the projected light of R and B combined into one beam in this way and emerging from the second polarizing beam splitter 11b, the B light is changed into the P polarization component (|) while the polarized direction thereof is rotated 90° by the second color-selective phase differentiate plate 8b. The P polarization component of the B light is further analyzed by the second polarizer 9b and then enters the third polarizing beam splitter 11c. The R light travels through the second color-selective phase differentiate plate 8b as it is, is further analyzed by the second polarizer 9b, and then enters the third polarizing beam splitter 11c. Through the detecting operation in the second polarizer 9b, the projected light of R and B turns into light from which invalid components produced during the passage through the second polarizing beam splitter 11b, the R, B reflective liquid crystal display 12b, 12r, and the quarter wave plate 13b, 13r are cut off.

Then the projected light of R and B entering the third polarizing beam splitter 11c is transmitted by the polarization separating surface of the third polarizing beam splitter 11c to be combined with the light of G reflected by the polarization separating surface thereof, and the combined light travels to the projection lens 14.

Here it is also possible to employ a configuration wherein a second half wave plate (not shown) is placed between the second color-selective phase differentiate plate 8b and the third polarizing beam splitter 11c, the slow axis of this second half wave plate is set in the same direction as the direction of transmitted polarization (i.e., in the direction in which the polarization state is not changed), the adjustment of inclination of the slow axis of the second half wave plate is carried out in the same manner as in the case of G, to effect such adjustment that the polarized direction of the R, B light is adequately incident to the polarization separating surface of the third polarizing beam splitter 11c, so as to minimize the leakage of non-projected light in the third polarizing beam splitter 11c, thus implementing the image adjustment of black display in R and B.

The projected light of R, G and B thus combined is enlarged and projected onto a projection surface S such as a screen or the like by the projection lens 14.

An antireflection coating is laid on a boundary surface in each of the above-stated optical elements to air. Each surface transmitting only the light of G is provided with an antireflection coating whose wavelength band at the minimum reflectance is set in the vicinity of 550 nm, and each surface transmitting only the light of R is provided with an antireflection coating whose wavelength band at the minimum reflectance is set in the vicinity of 610 nm. Each surface transmitting only the light of B is provided with an antireflection coating whose wavelength band at the minimum reflectance is set in the vicinity of 450 nm, and each surface transmitting the light of R and B is provided with an antireflection coating having two wavelength bands at minimum reflectances in the vicinity of 450 nm and in the vicinity of 610 nm.

Since the beams traveling from the light source 1 to the projection lens 14 have the smallest beam size at the reflective liquid crystal displays 11g; 11b and 11r, the polarizing beam splitters 11a and 11b placed near the reflective liquid crystal displays are configured in the size smaller than the polarizing beam splitter 11c placed on the projection lens 14 side.

Furthermore, Fno of the projection lens 14 is set brighter than Fno of the illumination system in consideration of deviation between the optical axis of the projection lens 14 and the optical axis of the condensing optical system 5 due to diffraction at the reflective liquid crystal displays, and mounting errors.

Second Embodiment

In the first embodiment described above, the light reflected by the polarization separating surface of the first polarizing beam splitter 11a was made incident to the first reflective liquid crystal display 12g. It is also possible to employ a configuration in which the light transmitted by the polarization separating surface of the first polarizing beam splitter is made incident to the display 12g. In general, the polarizing beam splitters have such performance that it is easier to prevent the light of S polarization from being mixed in the P polarized light transmitted by the polarizing beam splitter, and this ensures higher contrast for the projected images.

Figure 5:
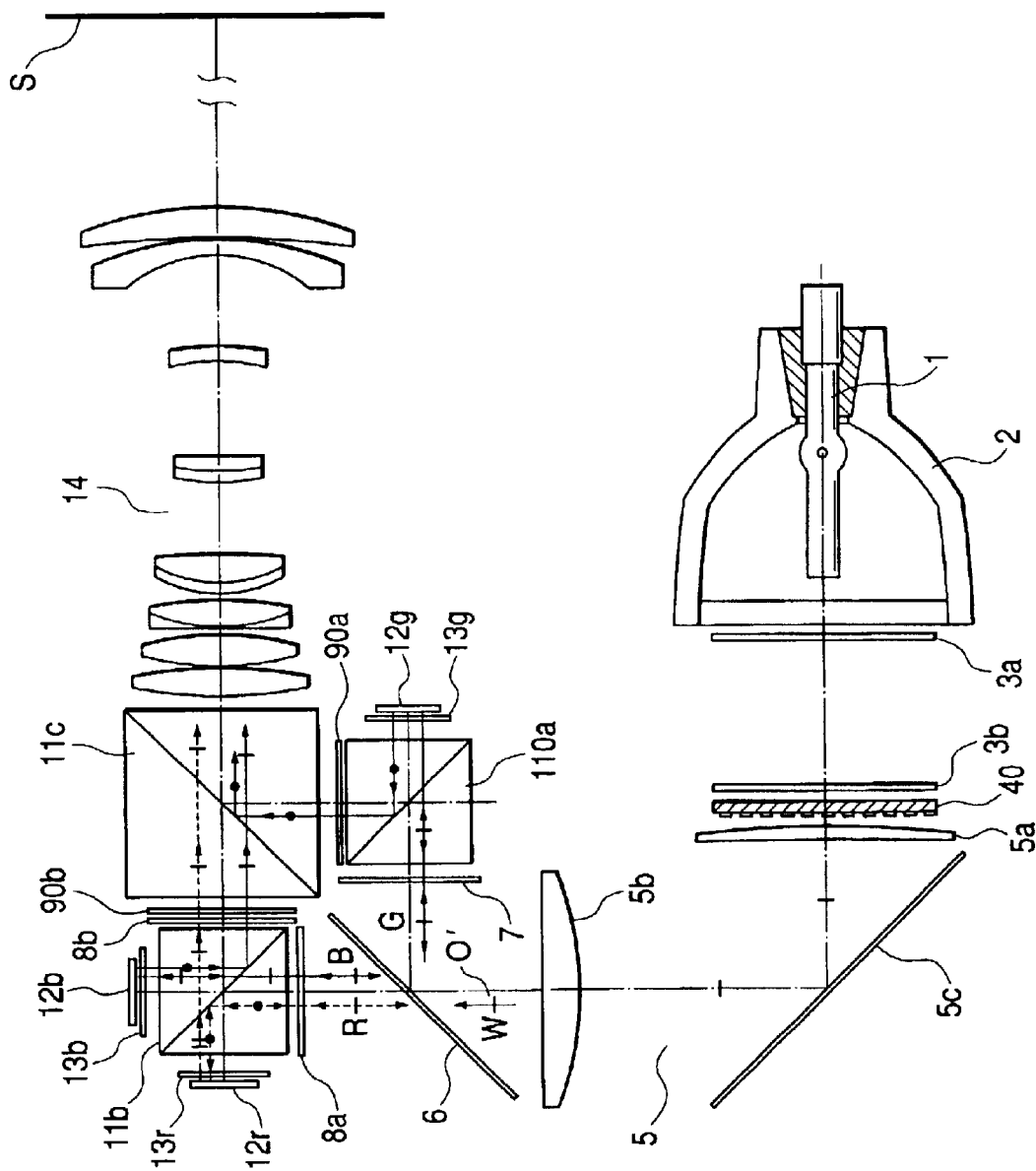
FIG. 5 is a diagram showing a configuration of a projection image display apparatus as a second embodiment.

FIG. 5 shows the configuration of the projection image display apparatus as a second embodiment of the present invention. In FIG. 5, the same components as those in the first embodiment are denoted by the same reference symbols, and the description thereof will be omitted herein.

In FIG. 5, numeral 40 designates a polarization changer, which changes the unpolarized light from the lamp 1 into the P polarized light (|). In the present embodiment, the first liquid crystal display 12g and the first quarter wave plate 13g are placed on the side where the P polarized light (|) travels straight through and out of the polarization separating surface of the first polarizing beam splitter 110a.

The polarization separating surface of the first polarizing beam splitter 110a has such a polarization separation characteristic that little S polarized light (•) is mixed in the P polarized light (|) transmitted by the polarization separating surface, i.e., that the degree of linear polarization is extremely high (e.g., almost 100%). The polarization separating surface of the first polarizing beam splitter 110a also has such a polarization separation characteristic that the degree of linear polarization of the S polarized light reflected by the polarization separating surface is a little lower than the degree of linear polarization of the P polarized light transmitted thereby.

The first polarizing plate 90a placed between the first polarizing beam splitter 110a and the third polarizing beam splitter 11c is a polarizer that transmits the S polarized light (•) but absorbs the P polarized light (|).

The optical action of the present embodiment will be described below. The illumination light emitted from the light source 1 is aligned into the P polarized light by the polarization changer 40, and the P polarized light is then incident to the dichroic mirror 6 to be separated into the light of green (G) and the light of red (R) and blue (B).

The G light reflected by the dichroic mirror 6 passes through the color filter 7 and enters the first polarizing beam splitter 110a. Since the G light was subjected to the polarization change at the polarization changer 40, most of it is the P polarized light and thus passes through the polarization separating surface of the first polarizing beam splitter 110a and through the first quarter wave plate 13g to impinge on the first reflective liquid crystal display 12g.

On this occasion, the S polarized light, which is mixed in small quantity in the illumination light because the conversion efficiency of the polarization changer 40 is a finite value, is reflected by the polarization separating surface of the first polarizing beam splitter 110a to be removed from the principal path.

For example, on the occasion of black display, the first reflective liquid crystal display 12g and the first quarter wave plate 13g reflect the incident light without any modulation action thereon, and this reflected light of G travels again through the polarization separating surface of the first polarizing beam splitter 110a and returns to the light source side. For example, on the occasion of white display, the first reflective liquid crystal display 12g does not change the polarized direction of the incident light, but the polarized direction is rotated 90° by the action of the first quarter wave plate. Therefore, the exiting light is the S polarized light, and this S polarized light is reflected by the polarization separating surface of the first polarizing beam splitter 110a, is analyzed by the first polarizer 90a, enters the third polarizing beam splitter 11c to be reflected by the polarization separating surface of the third polarizing beam splitter 11c, and then travels to the projection lens 14.

On this occasion, the first polarizer 90a absorbs phase error components produced by the action of the first reflective liquid crystal display 12g and during the passage through the first polarizing beam splitter 110a and the first quarter wave plate 13g.

The light of R and B transmitted by the dichroic mirror 6 is incident into the first color-selective phase differentiate plate 8a, only the polarized direction of the R light is changed from P to S, and the R light of the S polarized light and the B light of the P polarized light is then incident into the second polarizing beam splitter 11b.

The polarization separating surface of the second polarizing beam splitter 11b has such a polarization separation characteristic that the purity of the S polarized light reflected is approximately equal to the purity of the P polarized light transmitted (e.g., they are both approximately 95%). Namely, as in the case of the first embodiment, the polarization separation characteristic of the first polarizing beam splitter 110a is different from that of the second polarizing beam splitter 11b.

The R light incident as the S polarized light into the second polarizing beam splitter 11b is reflected by the polarization separating surface of the second polarizing beam splitter 11b and then travels through the second quarter wave plate 13r onto the second reflective liquid crystal display 12r. Then the R light reflected and modulated by the second reflective liquid crystal display 12r travels through the second quarter wave plate 13r to be changed into P polarized light, the P polarized light is again incident into the second polarizing beam splitter 11*b*, and it then travels through the polarization separating surface of the second polarizing beam splitter 11*b* to enter the second color-selective phase differentiate plate 8*b* and the second polarizer 90*b*.

The second color-selective phase differentiate plate 8*b* has the action of rotating only the polarized direction of the B light by 90°, but has no action on the R light. The second polarizer 90*b* is configured to transmit the P polarized light but absorb the S polarization component included in the R light emerging from the second polarizing beam splitter 11*b*.

The R light of the P polarized light analyzed by the second polarizer 90*b* is then incident into the third polarizing beam splitter 11*c*, travels through the polarization separating surface thereof, and reaches the projection lens 14.

The B light incident as the P polarized light into the second polarizing beam splitter 11*b* passes through the polarization separating surface of the second polarizing beam splitter 11*b*, and is then incident through the third quarter wave plate 13*b* onto the third reflective liquid crystal display 12*b*. Then the B light reflected and modulated by the third liquid crystal display 12*b* travels through the third quarter wave plate 13*b* to be changed into the S polarized light, the S polarized light is again incident into the second polarizing beam splitter 11*b* to be reflected by the polarization separating surface of the second polarizing beam splitter 11*b*; and the reflected light is then incident into the second color-selective phase differentiate plate 8*b*.

The B light incident into the second color-selective phase differentiate plate 8*b* is changed into the P polarized light while the polarized direction thereof is rotated by 90°. The B light of the P polarized light emerging from the second color-selective phase differentiate plate 8*b* is then incident into the second polarizer 90*b*, which absorbs the S polarization component included in the B light.

The B light analyzed by the second polarizer 90*b* in this way is incident into the third polarizing beam splitter 11*c*, travels through the polarization separating surface thereof, and reaches the projection lens 14.

The light of R, G and B combined by the action of the polarization separating surface of the third polarizing beam splitter 11*c* as described above is enlarged and projected by the projection lens 14 onto the projection surface S such as a screen or the like.

Since the present embodiment does not have to use the half wave plate 10*a* disposed in the G optical path in the first embodiment, the present embodiment is free of influence on transmittance due to the absorption action of light by the half wave plate. Accordingly, the present embodiment is able to provide brighter projected images.

In the above embodiments, a polarizing beam splitter may also be used instead of the dichroic mirror 6 in the first embodiment (FIG. 1) and in the second embodiment (FIG. 5). In that case, in order to maintain the optical paths of the color spectrums of the three colors separated, similar to those in Embodiments 1 and 2, it is necessary to place a color-selective phase differentiate plate with such a characteristic as to differentiate the green polarization component from the red and blue polarization components, on the light source side of the polarizing beam splitter placed instead of the dichroic mirror 6.

In each of the embodiments described above, the dichroic mirror 6 (or the polarizing beam splitter replacing it) was configured to separate the optical path of green light from the optical path of the red and blue light, but, without having to be limited to this, the apparatus may be configured to separate only the red light or separate only the blue light.

The polarizing beam splitters in each of the above embodiments had such a characteristic that the principal polarization component of the reflected light was the S polarized light and the principal polarization component of the transmitted light the P polarized light, but it is also possible to use the polarizing beam splitters having the characteristic opposite thereto.

In each of the above embodiments, the liquid crystal displays were reflective panels, but they may also be transmissive panels. In addition, the apparatus was of the three panel type (in which the liquid crystal displays were provided for the respective three color spectrums), but the apparatus may also be configured in a single panel type.

In each of the embodiments described above, the polarization separation characteristics of the first polarization separating surface and the second polarization separating surface are made different from each other according to the roles of the respective polarization separating surfaces, and the required transmittances and reflectances, it is feasible to readily overcome the problem of the degradation of contrast and the like due to the characteristics of the polarizing beam splitters.

For example, where the rate of the component in the principal polarized direction included in each color light is defined as a degree of linear polarization, the polarization separation characteristics of the first polarization separating surface and the second polarization separating surface are made different from each other so that the degree of linear polarization of the first color light incident from the first polarization separating surface to the first image display is higher than degree of linear polarization of the second and third color light incident from the second polarization separating surface to the second and third image displays, whereby the contrast of the first color light impinging on the first image display to be modulated thereby can be made higher than that of the other color light; particularly, when the first color light is the green light that largely affects the contrast of the color image, the total contrast of the color image combined can be enhanced, so as to obtain a display (projected) image with high quality.

Third Embodiment

Figure 6:
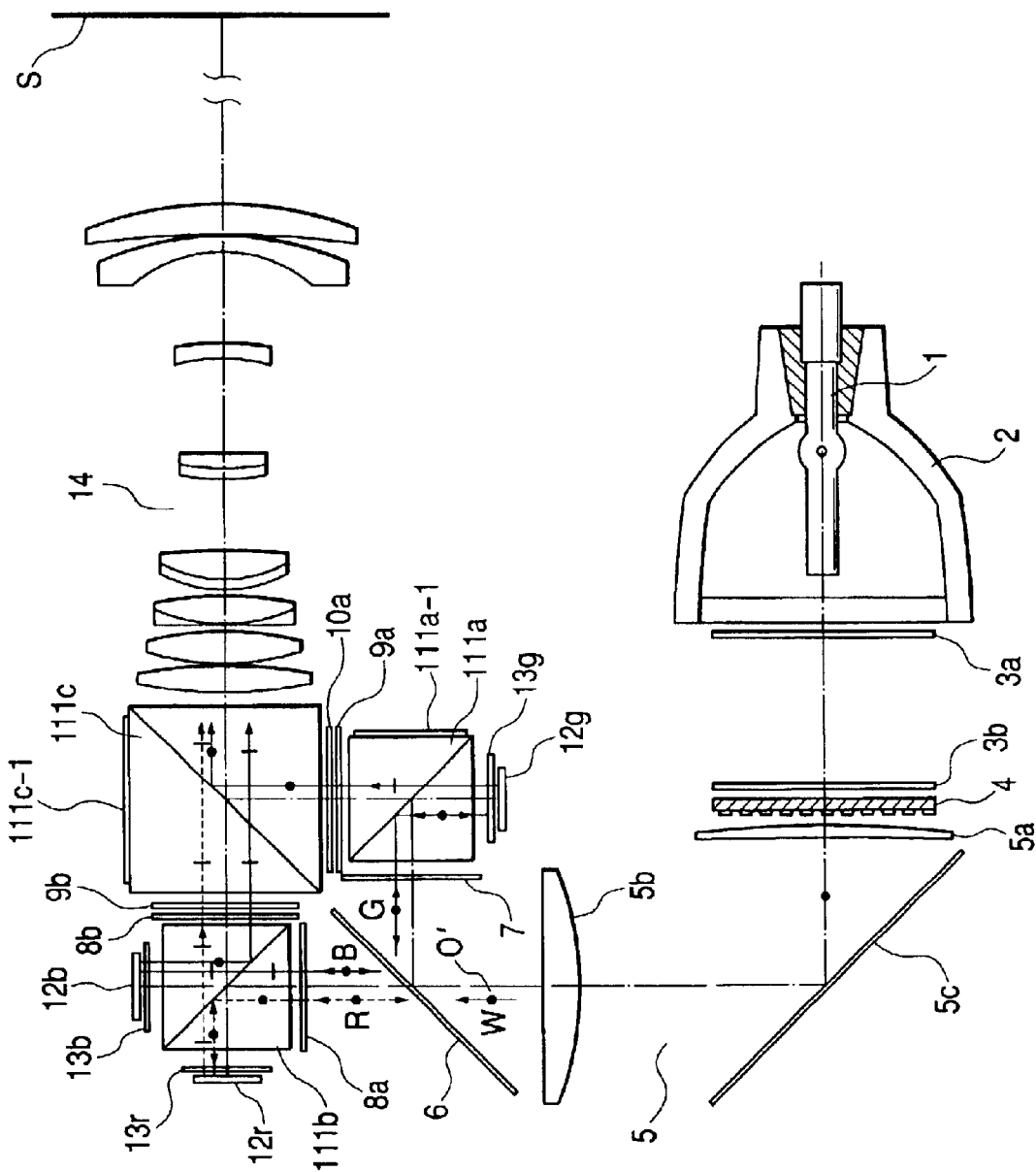
FIG. 6 is a diagram showing a configuration of a projection image display apparatus as a third embodiment.

FIG. 6 shows the configuration of the projection image display apparatus as a third embodiment of the present invention. In FIG. 6, the portions common to those in the embodiments described with FIG. 1 and FIG. 5 are denoted by the same reference symbols, and the description thereof will be omitted.

In FIG. 6, reference symbols 111*a* and 111*b* designate first and second polarizing beam splitters which transmit the P polarized light but reflect the S polarized light and which have their respective polarization separating surfaces (first and second polarization separating surfaces). Reference symbol 111*c* denotes a third polarizing beam splitter (color combining optical system) which transmits the P polarized light but reflects the S polarized light and which has a polarization separating surface (third polarization separating surface).

A surface 111*a*-1 of the first polarizing beam splitter 111*a*, which is a surface normal to the optical axis of the first beam splitter 111*a* and which is neither an entrance surface nor an exit surface, is a ground glass-like surface and is coated with a black light-absorbing paint so as to act as a light-absorbing surface. A surface 111*c*-1 of the third polarizing beam splitter 111*c*, which is a surface normal to the optical axis of the third beam splitter 111*c* and which is neither an entrance surface nor an exit surface, is also a ground glass-like surface and is coated with a black light-absorbing paint so as to act as a light-absorbing surface.

The optical action of the present embodiment will be described below. The light exiting the light source 1 is collected into the predetermined direction by the reflector 2. The reflector 2 is of the parabolic shape and light from the focal point of the paraboloid is changed into beams parallel to the symmetry axis of the paraboloid.

However, the light source 1 is not an ideal point source but has a finite size. Therefore, the collected beams include a lot of light components that are not parallel to the symmetry axis O of the paraboloid.

These collected beams are incident into the first fly's eye lens 3a. The first fly's eye lens 3a is comprised of a matrixlike combination of lenses having the rectangular contour and a positive refracting power. The incident beams are divided into a plurality of beams according to the respective lenses, and the beams are focused and guided through the second fly's eye lens 3b to form a plurality of light source images in a matrix pattern in the vicinity of the polarization changer 4.

The polarization changer 4 consists of polarization separating surfaces, reflective surfaces, and a half wave plate, and the plurality of beams focused in the matrix pattern are incident to the polarization separating surfaces corresponding to their columns, to be divided into the transmitted light of the P polarization component and the reflected light of the S polarization component.

The reflected light of the S polarization component is reflected on the reflective surfaces and then exits the polarization changer in the same direction as the P polarization component. On the other hand, the transmitted light of the P polarization component passes through the half wave plate 4c to be changed into the same polarization component as the S polarization component, and the light exits as light aligned in the polarized direction (•).

After emerging from the polarization changer 4, the plurality of beams thus polarization-changed arrive as diverging beams at the condensing optical system 5. Then the light changed into the S polarized light by the polarization changer 4 still remains as the S polarized light (•) even after separated by the dichroic mirror 6.

In the optical path of G, the light reflected by the dichroic mirror 6 is incident into the color filter 7. The color filter 7 has the characteristics as indicated by the dashed line in FIG. 4, and removes the yellow light, as a dichroic filter reflecting the color spectrum of yellow (575 to 585 nm) which is an intermediate wavelength region between G and R. If the spectrum of green includes a lot of the yellow component, green turns into yellow green. It is thus desirable to remove the yellow light in terms of color reproduction. The color filter 7 may be one having the property of absorbing the yellow light.

The G light color-adjusted in this way is incident as the S polarized light (•) into the first polarizing beam splitter 111a, is reflected by the polarization separating surface thereof, and then impinges on the G reflective liquid crystal display 12g.

On this occasion, the polarization separating surface of the first polarizing beam splitter 111a does not reflect all the S polarized light, but transmits part of the S polarized light and the P polarization component mixed in the illumination light because of the finite polarization conversion efficiency of the polarization changer. The transmitted light components impinge on the surface 111a-1 (the light-absorbing surface) which is located on an extension of the optical axis of incidence to the polarization separating surface of the first polarizing beam splitter 111a (i.e., which is perpendicular to the extension) and which is neither an entrance surface nor an exit surface.

Since the surface 111a-1 is the light-absorbing surface, those light components are absorbed there and thus never return through the first polarizing beam splitter 111a into the optical path.

The foregoing light-absorbing surface is fabricated by providing the face of the surface 111a-1 with predetermined surface roughness like ground glass and further coating this rough surface with a black light-absorbing paint.

The G reflective liquid crystal display 12g modulates the G light according to an image thereon and reflects the modulated G light. The S polarization component (•) out of the reflected G light image-modulated is again reflected by the polarization separating surface of the first polarizing beam splitter 111a and is guided back to the light source side to be removed from the projected light.

On this occasion, a small amount of the S polarized light is transmitted by the first polarization separating surface because of the characteristics thereof, and the S polarized light thus transmitted is converted into the P polarized light by the first half wave plate 9a. It is then incident into the third polarizing beam splitter 111c, is transmitted by the polarization separating surface thereof, and again travels through the third polarizing beam splitter 111c. Then the light impinges on the surface 11c-1 which is located on an extension of the optical axis of incidence to the polarization separating surface of the third polarizing beam-splitter 111c (i.e., which is perpendicular to the extension) and which is neither an entrance surface nor an exit surface.

Since the surface 111c-1 is constructed as a light-absorbing surface, similar to the surface 111a-1 of the first polarizing beam splitter 111a, the incident light is absorbed there and is thus prevented from returning to the third polarizing beam splitter 111c to become stray light.

On the other hand, the P polarization component (∥) out of the reflected G light image-modulated is transmitted by the first polarization separating surface and travels as projected light toward the third polarizing beam splitter 111c.

At this time, in a state in which all the polarization components are converted into the S polarized light (in a black display state), the slow axis of the quarter wave plate 13g, which is disposed between the first polarizing beam splitter 111a and the G reflective liquid crystal display 12g, is adjusted into a predetermined direction, whereby it is feasible to keep down the influence of disturbance of polarization caused by the first polarizing beam splitter 111a and the G reflective liquid crystal display 12g.

The G light (∥) exiting the first polarizing beam splitter 111a is analyzed by the first polarizer 9a, which transmits only the P polarized light. This results in obtaining light from which invalid components produced by passage through the first polarizing beam splitter 111a and the G reflective liquid crystal display 12g are cut off.

Then the polarized direction of the light is rotated 90° by the first half wave plate 10a with the slow axis being set at 45° relative to the polarized direction, and the light is incident as the S polarized light (•) into the third polarizing beam splitter 111c, is reflected by the polarization separating surface of the third polarizing beam splitter 111c, and then travels to the projection lens 14.

On this occasion, there exists a small amount of light transmitted by the polarization separating surface because of the characteristics of the polarization separating surface of the third polarizing beam splitter 111c. However, this light is incident to the surface 111c-1 of the third polarizing beam splitter 111c to be absorbed by the light-absorbing surface. Therefore, it is prevented from returning to the third polarizing beam splitter 111c, being reflected by the polarization separating surface thereof, and traveling toward the second polarizing beam splitter 111b to become stray light.

If the slow axis of the first half wave plate 10a is arranged as rotatably adjustable, it will be feasible to finely adjust the polarized direction of the G light incident to the polarization separating surface of the third polarizing beam splitter 111c.

By employing this configuration, where there is a relative inclination between the polarization separating surface of the first polarizing beam splitter 111a and the polarization separating surface of the third polarizing beam splitter 111c because of mounting errors or the like, the slow axis of the first half wave plate 10a can be adjusted by this adjusting mechanism so as to minimize the leakage of non-projected light in the third polarizing beam splitter 111c, thus enabling the image adjustment of black display in G.

Furthermore, the first polarizer 9a and the first half wave plate 10a may be bonded to each other, whereby they can be adjusted together.

The light of R and B transmitted by the dichroic mirror 6 is then incident into the first color-selective phase differentiate plate 8a. The first color-selective phase differentiate plate has the action of rotating the polarized direction of only the B light by 90°, by which the B light is incident as P polarized light (|) and the R light as S polarized light (•) into the second polarizing beam splitter 111b. The R light incident as the S polarized light (•) into the second polarizing beam splitter 111b is reflected by the polarization separating surface of the second polarizing beam splitter 111b and impinges on the R reflective liquid crystal display 12r. The B light incident as the P polarized light (|) into the second polarizing beam splitter 111b is transmitted by the polarization separating surface of the second polarizing beam splitter 111b and impinges on the B reflective liquid crystal display 12b.

The R light impinging on the R reflective liquid crystal display 12r is modulated according to an image thereon and reflected thereby. The S polarization component (•) out of the reflected R light image-modulated is again reflected by the polarization separating surface of the second polarizing beam splitter 111b and guided back to the light source side to be removed from the projected light.

On this occasion, similarly as in the case of the G light described above, part of the S polarized light is transmitted by the polarization separating surface, but this light is mostly reflected by the polarization separating surface of the third polarizing beam splitter 111c to impinge on the surface 111c-1 as a light-absorbing surface to be absorbed thereby.

On the other hand, the P polarization component (|) out of the reflected R light image-modulated is transmitted by the polarization separating surface of the second polarizing beam splitter 111b and travels as projected light toward the third polarizing beam splitter 111c.

The R light exiting the second polarizing beam splitter 111b travels through the second color-selective phase differentiate plate 8b as it is, is further analyzed by the second polarizer 9b, and then enters the third polarizing beam splitter 111c. Then the light travels through the polarization separating surface of the third polarizing beam splitter 111c and comes to the projection lens 14.

The B light impinging on the B reflective liquid crystal display 12b is modulated according to an image thereon and reflected thereby. The P polarization component (|) out of the reflected B light image-modulated is again transmitted by the polarization separating surface of the second polarizing beam splitter 111b and guided back to the light source side to be removed from the projected light. Just as in the other cases, part of the P polarized light (|) is also similarly reflected by the polarization separating surface, but this light is converted from the P polarized light (|) into the S polarized light (•) by the second color-selective phase differentiate plate 8b. The light is mostly reflected by the polarization separating surface of the third polarizing beam splitter 111c, and is then incident to the surface 111c-1 (light-absorbing surface), which is normal to the optical axis of the third polarizing beam splitter 111c and which is neither an entrance surface nor an exit surface, to be absorbed thereby.

On the other hand, the S polarization component (•) out of the reflected B light image-modulated is reflected by the polarization separating surface of the second polarizing beam splitter 111b and travels as projected light to the third polarizing beam splitter 111c.

At this time, the slow axes of the quarter wave plates 13b and 13r, which are disposed between the second polarizing beam splitter 111b and the R or B reflective liquid crystal display 12b and 12r are adjusted to effect the adjustment of black display in each of R and B, in the same manner as in the case of G.

Among the projected light of R and B combined into one beam and emerging from the second polarizing beam splitter 111b in this way, the B light is converted into the P polarization component (|) while the polarized direction thereof is rotated 90° by the second color-selective phase differentiate plate 8b. The B light of the P polarization component is further analyzed by the second polarizer 9b and then enters the third polarizing beam splitter 111c. The R light travels through the second color-selective phase differentiate plate 8b as it is, is further analyzed by the second polarizer 9b, and then enters the third polarizing beam splitter 111c. As analyzed by the second polarizer 9b, the projected light of R and B turns into light from which invalid components produced by passage through the second polarizing beam splitter 111b, the R or B reflective liquid crystal display 12b, 12r, and the quarter wave plate 13b, 13r are cut off.

Then the projected light of R and B entering the third polarizing beam splitter 111c is transmitted by the polarization separating surface of the third polarizing beam splitter 111c to be combined with the light of G reflected by the polarization separating surface thereof, and the combined light travels to the projection lens 14.

Here it is also possible to employ a configuration wherein a second half wave plate (not shown) is placed between the second color-selective phase differentiate plate 8b and the third polarizing beam splitter 111c, the slow axis of this second half wave plate is set in the same direction as the direction of the transmitted polarization (i.e., in the direction in which the polarization state is kept unchanged), and the adjustment of inclination of the slow axis of the second half wave plate is carried out in the same manner as in the case of G to effect such adjustment that the polarized direction of the R, B light is adequately incident to the polarization separating surface of the third polarizing beam splitter 111c, so as to minimize the leakage of non-projected light in the third polarizing beam splitter 111c, thus implementing the image adjustment of black display in R and B.

The projected light of R, G and B thus combined is enlarged and projected by the projection lens 14 onto the projection surface S such as a screen or the like.

An antireflection coating is laid on a boundary surface of each of the above-stated optical elements to air. Each surface transmitting only the light of G is provided with an antireflection coating whose wavelength band at the minimum reflectance is set in the vicinity of 550 nm, and each surface transmitting only the light of R is provided with an antireflection coating whose wavelength band at the minimum reflectance is set in the vicinity of 610 nm. Each surface transmitting only the light of B is provided with an antireflection coating whose wavelength band at the minimum reflectance is set in the vicinity of 450 nm, and each surface transmitting the light of R and B is provided with an antireflection coating having two wavelength bands at minimum reflectances in the vicinity of 450 nm and in the vicinity of 610 nm.

Since the beams traveling from the light source 1 to the projection lens 14 have the smallest beam size at the reflective liquid crystal displays 12g; 12b and 12r, the polarizing beam splitters 111a and 111b placed near the reflective liquid crystal displays are configured in the size smaller than the polarizing beam splitter 111c placed on the projection lens 14 side.

Furthermore, Fno of the projection lens 14 is set brighter than Fno of the illumination system in consideration of deviation between the optical axis of the projection lens 14 and the optical axis of the condensing optical system 5 due to diffraction at the reflective liquid crystal displays, and mounting errors.

In the present embodiment, the illumination optical system is configured so as to narrow down the beams most at the liquid crystal panels, so that the beams have some inclination. For this reason, though the aforementioned antireflection coatings are provided, light slightly reflected in the illumination optical paths becomes stray light, converges, and then diverges to impinge also on the upper and lower surfaces of the first to third polarizing beam splitters 111a to 111c (the surfaces on this side and that side with respect to the plane of the drawing: the surfaces placed in parallel with the optical axis) to be reflected there, increasing the stray light.

For the purpose of removing these light, the upper and lower surfaces parallel to the optical axes of the respective polarizing beam splitters may be constructed of the light-absorbing surfaces, as in the case of the surfaces 111a-1, 111c-1, so as to reduce the stray light more, thereby obtaining images with high contrast.

Fourth Embodiment

In the third embodiment, the surfaces, which were neither the entrance surface nor the exit surface of the polarizing beam splitters, were constructed as the light-absorbing surfaces, so as to enhance the contrast of the projected image. In the case of the light-absorbing surfaces as used in the third embodiment, the light source 1 of the image display apparatus is bright and emits a considerable amount of energy. Therefore, the temperature increases at the light-absorbing surfaces, so that it can result in degradation of the absorbing effect and even peeling-off of the film from the polarizing beam splitter.

In order to prevent it, the present embodiment employs heat radiating members for decreasing the temperature of the light-absorbing surfaces, provided so as to transmit heat from the light-absorbing surfaces to the radiating members (or so as to be thermally coupled), thereby preventing the degradation of the performance of the light-absorbing surfaces and the peeling-off and thus enabling achievement of high contrast even in the use of the bright light source 1 with high power.

Figure 7:
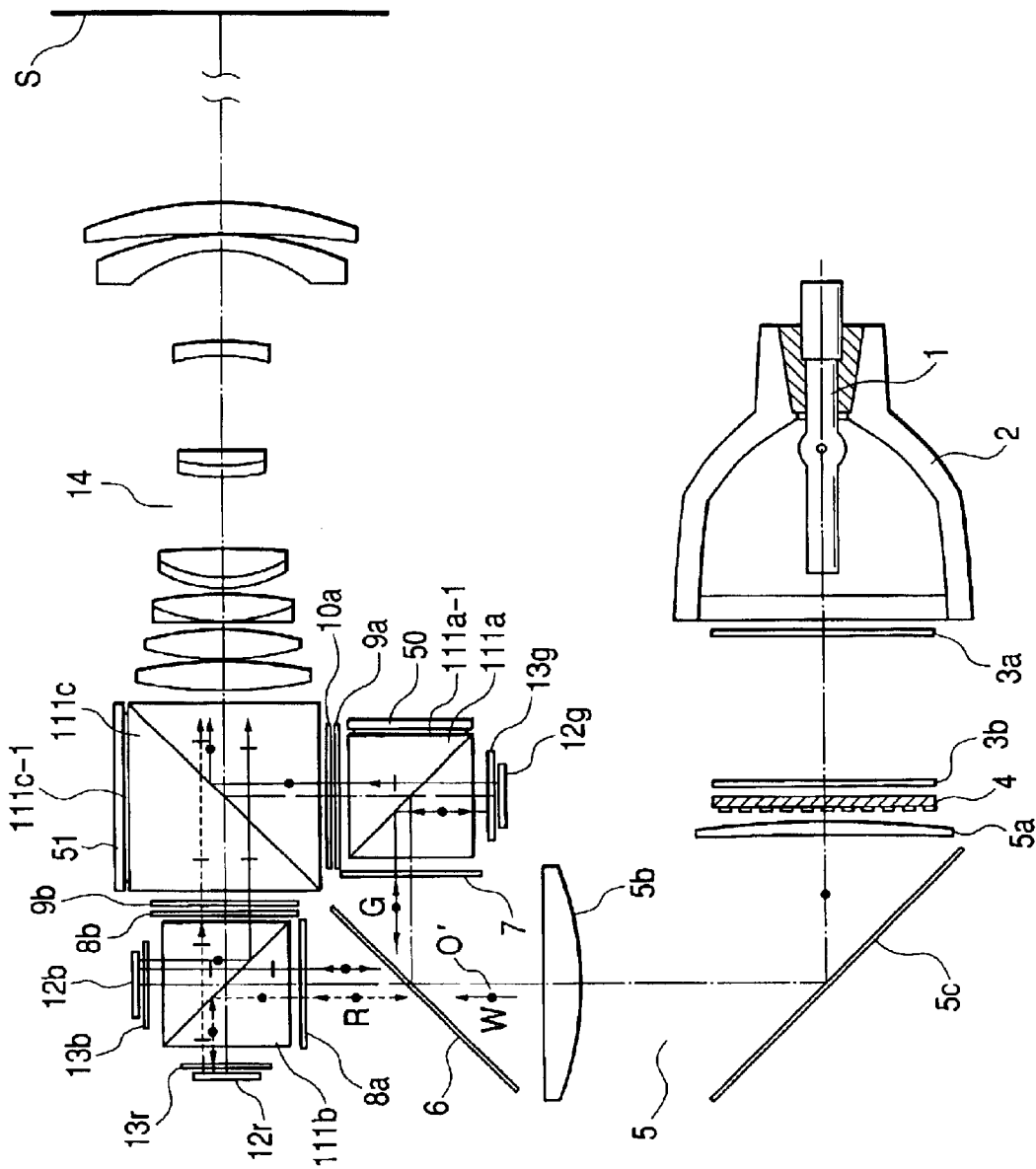
FIG. 7 is a diagram showing a configuration of a projection image display apparatus as a fourth embodiment.
Figure 8:
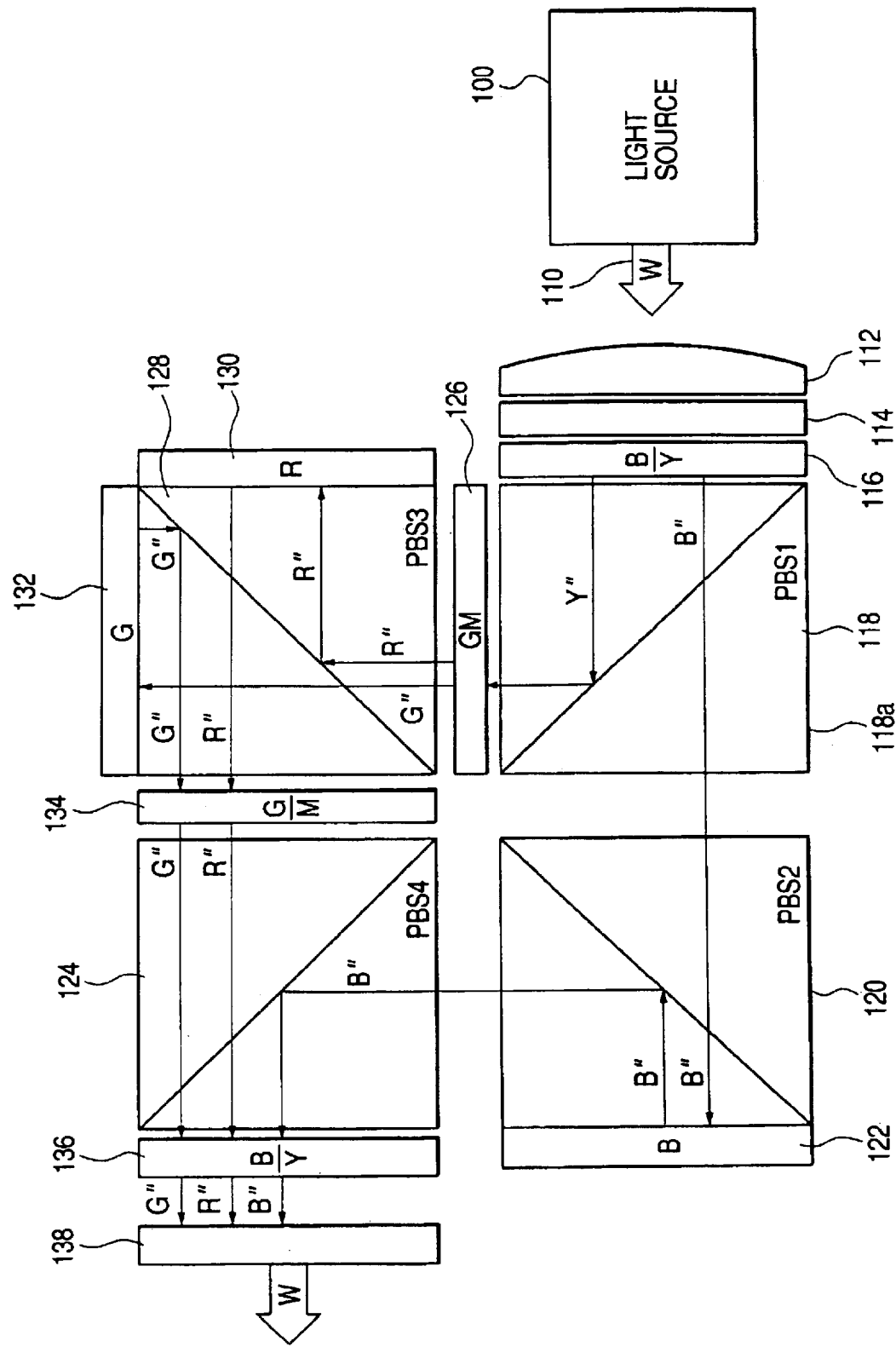
FIG. 8 is a diagram showing a configuration of a conventional projection image display apparatus.
Figure 9:
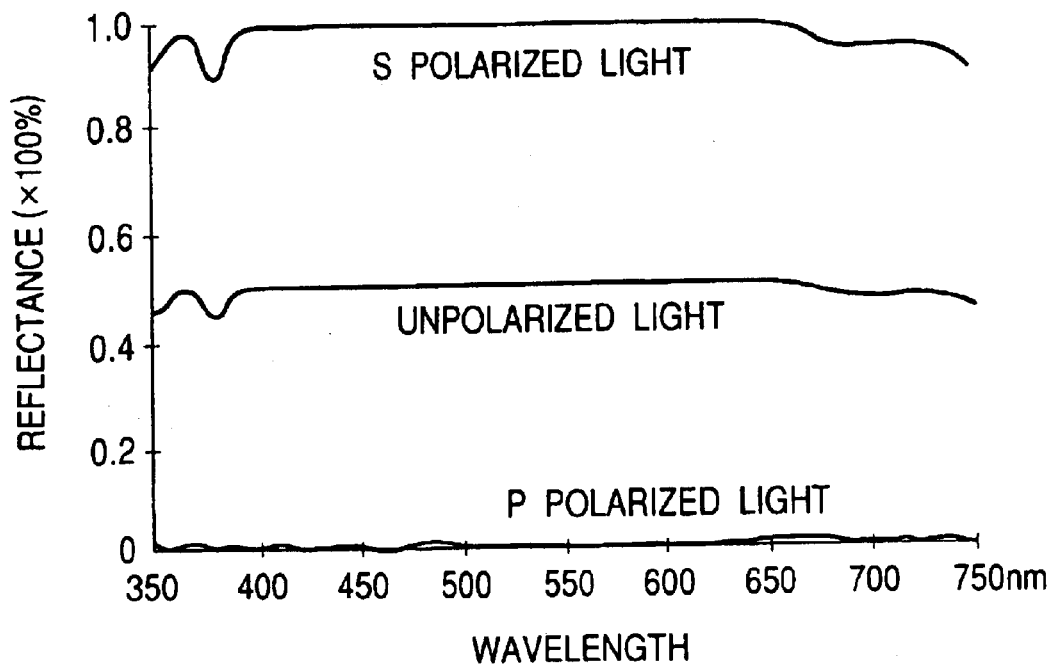
FIG. 9 is a diagram explaining characteristics (upon incidence at 45°) of the polarizing beam splitters in the conventional projection image display apparatus.
Figure 10:
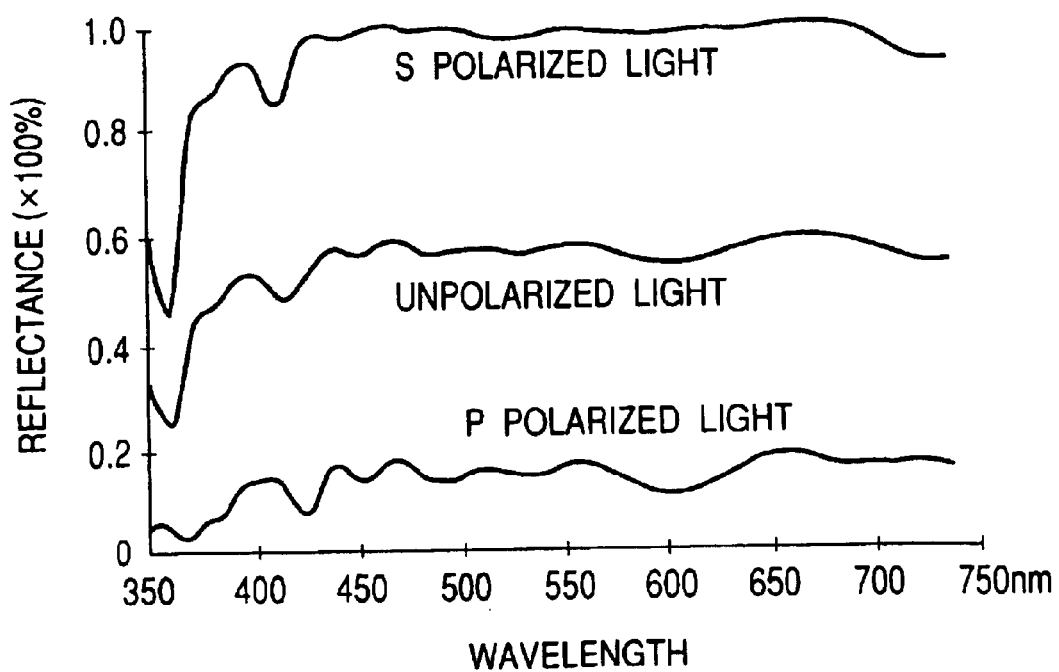
FIG. 10 is a diagram explaining characteristics (upon incidence at angles off 45°) of the polarizing beam splitters in the conventional projection image display apparatus.

FIG. 7 shows the configuration of the projection image display apparatus of the present embodiment. The components common to those in the third embodiment of FIG. 6 are denoted by the same reference symbols as in the third embodiment, and the description thereof will be omitted herein.

In FIG. 7, reference symbols 111a-1, 111c-1 represent first and second light-absorbing surfaces, similar to those described in the third embodiment. Numerals 50 and 51 denote first and second radiator plates, which are secured to the first and second light-absorbing surfaces 111a-1, 111c-1, respectively, with an adhesive having high thermal conductivity.

In this configuration, the first and second radiator plates 50, 51 act so as to radiate the heat generated by absorption of light at the first and second light-absorbing surfaces 111a-1, 111c-1, and thus are able to prevent the degradation and the peeling-off of the light-absorbing surfaces 111a-1, 111c-1 due to heat.

In the configuration wherein the radiator plates are secured to the light-absorbing surfaces with the adhesive or the like, there is a possibility that the black light-absorbing paint on the light-absorbing surfaces becomes easy to peel off from the surfaces of the polarizing beam splitters because of the weight of the radiator plates. In this case, it is also possible to employ a configuration wherein the light-absorbing surfaces are formed in a required minimum range on the polarizing beam splitters and the radiator plates are bonded to portions where no light-absorbing surface is formed.

The point herein is that the light-absorbing surface and the heat radiating member are thermally coupled to each other. Therefore, in addition to the bonding method with the adhesive as described above, it is also possible to employ a method of mechanically holding a radiator plate by a holding member and urging it against a light-absorbing surface, another thermal coupling method, and so on.

In the first embodiment described above with FIG. 1 and in the second embodiment described above with FIG. 5, the apparatus may also be configured so that each surface which is neither the entrance surface nor the exit surface of the polarizing beam splitter 11a, 110a or 11c is provided with the light-absorbing surface as described in the third and fourth embodiments with FIGS. 6 and 7.

In the embodiments described above, the surfaces located in the direction of extension of the optical axis of incidence to the polarization separating surface out of the surfaces which are neither the entrance surface nor the exit surface in the polarizing beam splitters, are constructed as the light-absorbing surfaces, whereby part of the light to be reflected by the polarization separating surface under normal circumstances can be prevented from being reflected by the surfaces provided with the light-absorbing surfaces to become stray light. When the light-absorbing surfaces are provided on the surfaces placed in parallel with the optical axis out of the surfaces which are neither the entrance surface nor the exit surface in the polarizing beam splitters, it is feasible to prevent unwanted reflection of light on the surfaces and prevent production of stray light.

For this reason, by applying this color separating-combining optical system to the image display optical system or the projection image display apparatus, it is feasible to display images with high contrast and without disturbance of color tone.

As described above, the light-absorbing surfaces are able to prevent the stray light exiting the optical system, from being reflected by a cover holding the optical system or the like, again entering the optical system, and again becoming stray light.

Furthermore, when the heat radiating member is thermally coupled to each light-absorbing surface, it is able to efficiently radiate the heat due to absorption of light at the light-absorbing surface and thereby prevent the degradation

What is claimed is:

1. A color separating-combining optical system comprising:
   a separating optical system which separates illumination light into a first color spectrum and a second color spectrum;
   a combining optical system which combines said first color spectrum and said second color spectrum;
   a first polarization separating optical system with a first polarization separating surface, which reflects said first color spectrum from said separating optical system to a first image display element, and transmits said first color spectrum from said first image display element to said combining optical system; and
   a second polarization separating optical system with a second polarization separating surface, which reflects said second color spectrum from said separating optical system to a second image display element, and transmits said second color spectrum from said second image display element to said combining optical system,
   wherein a degree of linear polarization of said first color spectrum reflected by said first polarization separating surface is higher than a degree of linear polarization of said second color spectrum reflected by said second polarization separating surface.

2. A color separating-combining optical system comprising:
   a separating optical system which separates illumination light into a first color spectrum and a second color spectrum;
   a combining optical system which combines said first color spectrum and said second color spectrum;
   a first polarization separating optical system with a first polarization separating surface, which reflects said first color spectrum from said separating optical system to a first image display element, and transmits said first color spectrum from said first image display element to said combining optical system; and
   a second polarization separating optical system with a second polarization separating surface, which reflects said second color spectrum from said separating optical system to a second image display element, and transmits said second color spectrum from said second image display element to said combining optical system,
   wherein a degree of linear polarization of said first color spectrum transmitted by said first polarization separating surface is higher than a degree of linear polarization of said second color spectrum transmitted by said second polarization separating surface.

3. A color separating-combining optical system comprising:
   a separating optical system which separates illumination light into a first color spectrum and a second color spectrum;
   a combining optical system which combines said first color spectrum and said second color spectrum;
   a first polarization separating optical system with a first polarization separating surface, which transmits said first color spectrum from said separating optical system to a first image display element, and reflects said first color spectrum from said first image display element to said combining optical system; and
   a second polarization separating optical system with a second polarization separating surface, which transmits said second color spectrum from said separating optical system to a second image display element, and reflects said second color spectrum from said second image display element to said combining optical system,
   wherein a degree of linear polarization of said first color spectrum transmitted by said first polarization separating surface is higher than a degree of linear polarization of said second color spectrum transmitted by said second polarization separating surface.

4. A color separating-combining optical system comprising:
   a separating optical system which separates illumination light into a first color spectrum and a second color spectrum;
   a combining optical system which combines said first color spectrum and said second color spectrum;
   a first polarization separating optical system with a first polarization separating surface, which transmits said first color spectrum from said separating optical system to a first image display element, and reflects said first color spectrum from said first image display element to said combining optical system; and
   a second polarization separating optical system with a second polarization separating surface, which transmits said second color spectrum from said separating optical system to a second image display element, and reflects said second color spectrum from said second image display element said combining optical system,
   wherein a degree of linear polarization of said first color spectrum reflected by said first polarization separating surface is higher than a degree of linear polarization of said second color spectrum reflected by said second polarization separating surface.

5. A projection type image display apparatus comprising:
   an illumination system;
   a separating optical system which separates illumination light from said illumination system into a first color spectrum and a second color spectrum;
   a first image display element which modulates said first color spectrum;
   a second image display element which modulates said second color spectrum;
   a combining optical system which combines said first color spectrum and said second color spectrum;
   a projecting optical system which projects combined light from said combining optical system;
   a first polarization separating optical system with a first polarization separating surface, which reflects said first color spectrum from said separating optical system to said first image display element, and transmits said first color spectrum from said first image display element to said combining optical system, and
   a second polarization separating optical system with said second polarization separating surface, which reflects said second color spectrum from said separating optical system to a second image display element, and transmits said second color spectrum from said second image display element to said combining optical system,
   wherein a degree of linear polarization of said first color spectrum reflected by said first polarization separating surface is higher than a degree of linear polarization of said second color spectrum reflected by said second polarization separating surface.

6. A projection type image display apparatus according to claim 5, wherein said first color spectrum includes light of green, and said second color spectrum includes light of blue or red.

7. A projection type image display apparatus comprising:
an illumination system;
a separating optical system which separates illumination light from said illumination system into a light of green and a light of blue and red;
a green light image display element which modulates said light of green;
a blue light image display element which modulates said light of blue;
a red light image display element which modulates said light of red;
a combining optical system which combines said light of green and said light of blue and red;
a projecting optical system which projects combined light from said combining optical system;
a first polarization separating optical system with a first polarization separating surface, which reflects said light of green from said separating optical system to said green light image display element, and transmits said light of green from said green light image display element to said combining optical system; and
a second polarization separating optical system with said second polarization separating surface, which reflects said light of blue from said separating optical system to said blue light image display element, and transmits said light of blue from said blue light image display element to said combining optical system, and which reflects said light of red from said separating optical system to said red light image display element, and transmits said light of red from said red light image display element to said combining optical system,
wherein a degree of linear polarization of said light of green reflected by said first polarization separating surface is higher than a degree of linear polarization of said light of red reflected by said second polarization separating surface.

8. A projection type image display apparatus comprising:
an illumination system;
a separating optical system which separates illumination light from said illumination system into a first color spectrum and a second color spectrum;
a first image display element which modulates said first color spectrum;
a second image display element which modulates said second color spectrum;
a combining optical system which combines said first color spectrum and said second color spectrum;
a projecting optical system which projects combined light from said combining optical system;
a first polarization separating optical system with a first polarization separating surface, which reflects said first color spectrum from said separating optical system to said first image display element, and transmits said first color spectrum from said first image display element to said combining optical system; and
a second polarization separating optical system with said second polarization separating surface, which reflects said second color spectrum from said separating optical system to a second image display element, and transmits said second color spectrum from said second image display element to said combining optical system,
wherein a degree of linear polarization of said first color spectrum transmitted by said first polarization separating surface is higher than a degree of linear polarization of said second color spectrum transmitted by said second polarization separating surface.

9. A projection type image display apparatus according to claim 8, wherein said first color spectrum includes light of green, and said second color spectrum includes light of blue or red.

10. A projection type image display apparatus comprising:
an illumination system;
a separating optical system which separates illumination light from said illumination system into a light of green and a light of blue and red;
a green light image display element which modulates said light of green;
a blue light image display element which modulates said light of blue;
a red light image display element which modulates said light of red;
a combining optical system which combines said light of green and said light of blue and red;
a projecting optical system which projects combined light from said combining optical system;
a first polarization separating optical system with a first polarization separating surface, which reflects said light of green from said separating optical system to said green light image display element, and transmits said light of green from said green light image display element to said combining optical system; and
a second polarization separating optical system with said second polarization separating surface, which reflects said light of blue from said separating optical system to said blue light image display element, and transmits said light of blue from said blue light image display element to said combining optical system, and which reflects said light of red from said separating optical system to said red light image display element, and transmits said light of red from said red light image display element to said combining optical system,
wherein a degree of linear polarization of said light of green transmitted by said first polarization separating surface is higher than a degree of linear polarization of said light of red transmitted by said second polarization separating surface.

11. A projection type image display apparatus comprising:
an illumination system;
a separating optical system which separates illumination light from said illumination system into a first color spectrum and a second color spectrum;
a first image display element which modulates said first color spectrum;
a second image display element which modulates said second color spectrum;
a combining optical system which combines said first color spectrum and said second color spectrum;
a projecting optical system which projects combined light from said combining optical system;
a first polarization separating optical system with a first polarization separating surface, which transmits said first color spectrum from said separating optical system to said first image display element, and reflects said first color spectrum from said first image display element to said combining optical system; and a second polarization separating optical system with said second polarization separating surface, which transmits said second color spectrum from said separating optical system to said second image display element, and reflects said second color spectrum from said second image display element to said combining optical system, wherein a degree of linear polarization of said first color spectrum transmitted by said first polarization separating surface is higher than a degree of linear polarization of said second color spectrum transmitted by said second polarization separating surface.

12. A projection type image display apparatus according to claim 11, wherein the degree of linear polarization of said first color spectrum transmitted by said first polarization surface is higher than a degree of linear polarization of said first color spectrum reflected by said first polarization surface.

13. A projection type image display apparatus comprising:
an illumination system;
a separating optical system which separates illumination light from said illumination system into a first color spectrum and a second color spectrum;
a first image display element which modulates said first color spectrum;
a second image display element which modulates said second color spectrum;
a combining optical system which combines said first color spectrum and said second color spectrum;
a projecting optical system which projects combined light from said combining optical system;
a first polarization separating optical system with a first polarization separating surface, which transmits said first color spectrum from said separating optical system to said first image display element, and reflects said first color spectrum from said first image display element to said combining optical system; and
a second polarization separating optical system with said second polarization separating surface, which transmits said second color spectrum from said separating optical system to a second image display element, and reflects said second color spectrum from said second image display element to said combining optical system,
wherein a degree of linear polarization of said first color spectrum reflected by said first polarization separating surface is higher than a degree of linear polarization of said second color spectrum reflected by said second polarization separating surface.

14. A projection type image display apparatus according to claim 13, wherein the degree of linear polarization of said first color spectrum transmitted by said first polarization surface is higher than a degree of linear polarization of said first color spectrum reflected by said first polarization surface.

15. A color separating-combining optical system comprising:
a separating optical system which separates illumination light into a first color spectrum and a second color spectrum;
a combining optical system which combines said first color spectrum and said second color spectrum;

a first polarization separating optical system which reflects said first color spectrum from said separating optical system to a first image display element, and transmits said first color spectrum from said first image display element to said combining optical system;
a second polarization separating optical system which guides said second color spectrum from said separating optical system to a second image display element, and guides said second color spectrum from said second image display element to said combining optical system; and
an antireflection element which is located on an optical path of said first color spectrum from said separating optical system, which should be reflected by said first polarization separating optical system but transmits said first polarization separating optical system.

16. A color separating-combining optical system comprising:
a separating optical system which separates illumination light into a first color spectrum and a second color spectrum;
a combining optical system with polarization separating surface, which combines said first color spectrum and said second color spectrum, by reflecting said first color spectrum and transmitting said second color spectrum;
a first polarization separating optical system which guides said first color spectrum from said separating optical system to a first image display element, and guides said first color spectrum from said first image display element to said combining optical system;
a second polarization separating optical system which guides said second color spectrum from said separating optical system to a second image display element, and guides said second color spectrum from said second image display element to said combining optical system; and
an antireflection element which is located in an optical path of said first color spectrum which should be reflected by said first polarization separating optical system but transmitted by said combining optical system.

17. A projection type image display apparatus comprising:
an illumination system;
a separating optical system which separates illumination light from said illumination system into a first color spectrum and a second color spectrum;
a first image display element which modulates said first color spectrum;
a second image display element which modulates said second color spectrum;
a combining optical system which combines said first color spectrum and said second color spectrum;
a projecting optical system which projects combined light from said combining optical system;
a first polarization separating separating optical system which reflects said first color spectrum from said separating optical system to a first image display element, and transmits said first color spectrum from said first image display element to said combining optical system;
a second polarization separating optical system which guides said second color spectrum from said separating optical system to a second image display element, and guides said second color spectrum from said second image display element to said combining optical system; and an antireflection element which is located on an optical path of said first color spectrum from said separating optical system, which should be reflected by said first polarization separating optical system but transmitted by said first polarization separating optical system.

18. A projection type image display apparatus according to claim 17 wherein said first polarization separating optical system has a shape of prism, and said antireflection element is adhered with the prism surface of said first polarization separating optical system.

19. A projection type image display apparatus according to claim 18 wherein said antireflection element has a heat radiating member located on a side opposed to a side adhered with said first polarization separating surface.

20. A projection type image display apparatus according to claim 17, wherein said antireflection element has a surface with a predetermined surface roughness.

21. A projection type image display apparatus according to claim 17, wherein said antireflection element has a surface on which light-absorbing paint is coated.

22. A projection type image display apparatus according to claim 17, wherein said first color spectrum includes a light of green, and said second color spectrum includes a light of blue or red.

23. A projection type image display apparatus comprising:
an illumination system;
a separating optical system which separates illumination light from said illumination system into a light of green and a light of blue or red;
a green light image display element which modulates said light of green;
a blue light image display element which modulates said light of blue;
a red light image display element which modulates said light of red;
a combining optical system which combines said light of green and said light of blue and red;
a projecting optical system which projects combined light from said combining optical system;
a first polarization separating optical system which reflects said light of green from said separating optical system to said green light image display element, and transmits said light of green from said green light image display element to said combining optical system;
a second polarization separating optical system which guides said light of blue from said separating optical system to said blue light image display element,and guides said light of blue from said blue light image display element to said combining optical system, and which guides said light of red from said separating optical system to said red light image display element, and guides said light of red from said red light image display element to said combining optical system; and
an antireflection element which is located on an optical path of said light of green from said separating optical system, which should be reflected by said first polarization separating optical system but transmitted by said first polarization separating optical system.

24. A projection type image display apparatus comprising:
an illumination system;
a separating optical system which separates illumination light into a first color spectrum and a second color spectrum;
a first image display element which modulates said first color spectrum;

a second image display element which modulates said second color spectrum;
a combining optical system with polarization separating surface, which combines said first color spectrum and said second color spectrum, by reflecting said first color spectrum and transmitting said second color spectrum;
a projecting optical system which projects a combined light from said combining optical system;
a first polarization separating optical system which guides said first color spectrum from said separating optical system to said first image display element, and guides said first color spectrum from said first image display element to said combining optical system.
a second polarization separating optical system which guides said second color spectrum from said separating optical system to said second image display element, and guides said second color spectrum from said second image display element to said combining optical system; and
an antireflection element which is located on an optical path of said first color spectrum which should be reflected by said combining optical system but transmitted by said combining optical system.

25. A projection type image display apparatus according to claim 24, wherein said first color spectrum includes a light of green, and said second color spectrum includes a light of blue or red.

26. A projection type image display apparatus comprising:
an illumination system;
a separating optical system which separates illumination light from said illumination system into a light of green and a light of blue and red;
a green light image display element which modulates said light of green;
a blue light image display element which modulates said light of blue;
a red light image display element which modulates said light of red;
a combining optical system with a polarization separating surface, which combines said light of green and said light of blue and red, by reflecting said light of green and by transmitting said light of blue and red;
a projecting optical system which projects combined light from said combining optical system;
a first polarization separating optical system which guides said light of green from said separating optical system to said green light image display element, and guides said light of green from said green light image display element to said combining optical system;
a second polarization separating optical system which guides said light of blue from said separating optical system to said blue light image display element, and guides said light of blue from said blue light image display element to said combining optical system, and which guides said light of red from said separating optical system to said red light image display element, and guides said light of red from said red light image display element to said combining optical system; and
an antireflection element which is located on an optical path of said light of green from said separating optical system, which should be reflected by said combining optical system but transmitted by said combining optical system.

27. A projection type image display apparatus comprising:
an illumination system;
a separating optical system which separates illumination light into a first color spectrum and a second color spectrum;
a first image display element which modulates said first color spectrum;
a second image display element which modulates said second color spectrum;
a combining optical system with polarization separating surface, which combines said first color spectrum and said second color spectrum, by reflecting said first color spectrum and transmitting said second color spectrum;
a projecting optical system which projects a combined light from said combining optical system;
a first polarization separating optical system which reflects said first color spectrum from said separating optical system to said first image display element, and transmits said first color spectrum from said first image display element to said combining optical system;
a second polarization separating optical system which guides said second color spectrum from said separating optical system to said second image display element, and guides said second color spectrum from said second image display element to said combining optical system;
a first antireflection element which is located on an optical path of said first color spectrum which should be reflected by said first polarization separating optical system but transmitted by said first polarization separating optical system; and
a second antireflection element which is located on an optical path of said second color spectrum which should be reflected by said second polarization separating optical system but transmitted by said second polarization separating optical system.

28. A color separating-combining optical system comprising:
a first image display element, a second image display element, and a third image display element;
color spectrum separating means for separating an illumination light into a green spectrum, and a blue spectrum and a red spectrum;
a first polarization separating surface for making, by a polarization separation effect, an optical path along which the green spectrum is incident into the first image display element from the color spectrum separating means, different from an optical path along which the green spectrum is emerged from the first image display element;
a second polarization separating surface for separating, by a polarization separation effect the blue spectrum and the red spectrum from the color spectrum separating means independently, and for making, by a polarization separation effect, an optical path along which the blue spectrum is incident into the second image display element, different from an optical path along which the blue spectrum is emerged from the second image display element, and an optical path along which the red spectrum is incident into the third image display element, different from an optical path along which the red spectrum is emerged from the third image display element; and a third polarization separating surface for combining the green spectrum from the first polarization separating surface, with the blue spectrum and the red spectrum from the second polarization separating surface,
wherein a polarization separation characteristic of the first polarization separating surface is made different from a polarization separation characteristic of the second polarization separating surface, so that when a ratio of a component of main polarized direction of the green spectrum, blue spectrum and red spectrum is assumed as a degree of linear polarization, a degree of linear polarization of the green spectrum at the time of being incident into the first image display element from the first polarization separating surface is higher than a degree of linear polarization of the blue spectrum at the time of being incident into the second image display element from the second polarization separating surface and a degree of linear polarization of the red spectrum at the time being incident into the third image display element from the second polarization separating surface.

29. A color separating-combining optical system according to claim 28, wherein the second polarization separating surface has a polarization separation characteristic of making a degree of linear polarization of blue spectrum reflected by the second polarization separating surface substantially equal to a degree of linear polarization of the blue spectrum transmitted through the second polarization separating surface, and making a degree of linear polarization of red spectrum reflected by the second polarization separating surface substantially equal to a degree of linear polarization of the red spectrum transmitted through the second polarization separating surface.

30. A color separating-combining optical system according to claim 28, wherein the first polarization separating surface has a polarization separation characteristic of making a degree of linear polarization of the green spectrum at the time of being incident into the first image display element from the first polarization separating surface, higher than a degree of linear polarization of green spectrum at the time of being incident into the third polarization separating surface from the first polarization separating surface through the first image display element.

31. A color separating-combining optical system according to claim 28, further comprising a polarization plate located between the first polarization separating surface and the third polarization separating surface.

32. A color separating-combining optical system according to claim 28, wherein the first image display element, second image display element and third image display element are reflection type image display elements.

33. A projection type image display apparatus comprising:
a color separating-combining optical system according to claim 28, an illumination optical system for making illumination light incident into the color separating-combining optical system at a state in which the polarized direction of the incident light is aligned; and
a projection optical system for projecting color light emerged from the color separating-combining optical system.

* * * * *